United States Patent
Dong et al.

(10) Patent No.: US 12,081,375 B2
(45) Date of Patent: Sep. 3, 2024

(54) DATA SENDING METHOD AND APPARATUS

(71) Applicant: Huawei Technologies Co., Ltd., Guangdong (CN)

(72) Inventors: Pengpeng Dong, Shanghai (CN); Zijie Xu, Shanghai (CN); Yuanjie Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 532 days.

(21) Appl. No.: 17/334,423

(22) Filed: May 28, 2021

(65) Prior Publication Data

US 2021/0288847 A1 Sep. 16, 2021

Related U.S. Application Data

(63) Continuation of application No. PCT/CN2019/107949, filed on Sep. 25, 2019.

(30) Foreign Application Priority Data

Nov. 29, 2018 (CN) .......................... 201811447895.8

(51) Int. Cl.
*H04L 1/06* (2006.01)
*H04L 1/00* (2006.01)
(Continued)

(52) U.S. Cl.
CPC ...... *H04L 25/03929* (2013.01); *H04L 1/0003* (2013.01); *H04L 5/0053* (2013.01); *H04L 25/4927* (2013.01)

(58) Field of Classification Search
CPC ............... H04L 27/0012; H04L 1/0003; H04L 25/03929; H04L 25/4927; H04L 27/0008;
(Continued)

(56) References Cited

U.S. PATENT DOCUMENTS 7,813,436 B1 * 10/2010 Zhao ................... H04L 27/2676
375/216
8,416,885 B2 * 4/2013 Suo ........................ H04L 5/0048
375/267
(Continued)

FOREIGN PATENT DOCUMENTS

CN 101179358 A * 5/2008
CN 101431357 A 5/2009
(Continued)

*Primary Examiner* — Edan Orgad
*Assistant Examiner* — Vanneilian Lalchinthang
(74) *Attorney, Agent, or Firm* — WOMBLE BOND DICKINSON (US) LLP

(57) ABSTRACT

This application provides a data sending method and apparatus. The method includes: A node generates a first modulation symbol corresponding to a first modulation scheme. The node quantizes the first modulation symbol to obtain a target symbol. The target symbol corresponds to one of a plurality of constellation points of a second modulation scheme. The node preprocesses the target symbol to obtain to-be-sent data. The preprocessing includes one or more of layer mapping, antenna port mapping, precoding, or transform precoding. The node maps the to-be-sent data to a physical resource, and sends the to-be-sent data by using the physical resource.

14 Claims, 14 Drawing Sheets

(51) Int. Cl.
  *H04L 5/00* (2006.01)
  *H04L 25/03* (2006.01)
  *H04L 25/49* (2006.01)
  *H04L 27/00* (2006.01)
  *H04Q 1/20* (2006.01)

(58) Field of Classification Search
  CPC . H04L 27/2035; H04L 27/206; H04L 27/362; H04L 5/0053; H04L 1/0031; H04L 2001/0097; H04L 5/0026; H04L 5/0044; H04L 1/242; Y02D 30/70; H04B 17/309; H04B 7/12; H04B 7/0617; H04B 7/068; H04B 7/10
  USPC .......................................................... 370/329
  See application file for complete search history.

(56) References Cited

U.S. PATENT DOCUMENTS

| | | | | |
|---|---|---|---|---|
| 8,774,326 | B2* | 7/2014 | Au Yeung | H04L 25/067 |
| | | | | 370/464 |
| 9,647,733 | B2* | 5/2017 | Ling | H04L 1/0068 |
| 9,954,719 | B2* | 4/2018 | Lu | H04B 7/15542 |
| 10,164,735 | B2* | 12/2018 | Yu | H04L 1/0041 |
| 2002/0142728 | A1* | 10/2002 | Paul | H04L 1/20 |
| | | | | 455/67.11 |
| 2011/0044379 | A1* | 2/2011 | Lilleberg | H04L 1/1845 |
| | | | | 375/211 |
| 2011/0299455 | A1* | 12/2011 | Ordentlich | H04L 67/12 |
| | | | | 370/328 |
| 2012/0257692 | A1 | 10/2012 | Yeung et al. | |
| 2014/0086296 | A1* | 3/2014 | Badic | H04L 27/0008 |
| | | | | 375/229 |
| 2014/0226699 | A1* | 8/2014 | Kim | H04L 1/0071 |
| | | | | 375/295 |
| 2015/0334421 | A1* | 11/2015 | Deiss | H04L 1/007 |
| | | | | 375/240.27 |
| 2021/0345259 | A1* | 11/2021 | Yeo | H04W 28/0278 |

FOREIGN PATENT DOCUMENTS

| | | |
|---|---|---|
| CN | 102986155 A | 3/2013 |
| CN | 103117757 A | 5/2013 |
| CN | 105191305 A | 12/2015 |
| CN | 107211033 A | 9/2017 |
| WO | 2017196246 A2 | 11/2017 |

* cited by examiner

DATA SENDING METHOD AND APPARATUS

CROSS-REFERENCE TO RELATED APPLICATIONS

This application is a continuation of International Application No. PCT/CN2019/107949, filed on Sep. 25, 2019, which claims priority to Chinese Patent Application No. 201811447895.8, filed on Nov. 29, 2018. The disclosures of the aforementioned applications are hereby incorporated by reference in their entireties.

TECHNICAL FIELD

This application relates to the field of communication technologies, and in particular, to a data sending method and apparatus.

BACKGROUND

Conventional data forwarding manners include decoding forwarding (decoding forwarding, DF). In the DF manner, after receiving data from a previous sending node, a forwarding node needs to demodulate and decode the data, and/or determine, based on whether the decoding is correct, whether to forward the data. If the decoding is correct, the forwarding node may re-encode and re-modulate the decoded data, and send the re-encoded and re-modulated data to a next receiving node. A main problem of the DF manner is as follows: In the DF manner, when the forwarding node incorrectly decodes the data that is from the previous sending node, the forwarding node cannot forward the data, and consequently, forwarding performance is degraded.

Soft modulation can resolve the foregoing main problem of DF. By sending data generated through soft modulation, the forwarding node can still forward the data when the forwarding node incorrectly decodes the data that is from the previous sending node. This improves forwarding performance. However, a signal generated through soft modulation may not meet a requirement of an intermediate frequency indicator of an intermediate frequency device/a radio frequency indicator of a radio frequency device. For example, soft modulation may cause an excessively large peak to average power ratio (peak to average power ratio, PAPR) of the generated signal, or soft modulation may cause an excessively large error vector magnitude (error vector magnitude, EVM) of the generated signal. As a result, it is possible that the signal generated through soft modulation cannot be sent by using the intermediate frequency/radio frequency device. Therefore, how to ensure the intermediate frequency/radio frequency indicator of the generated signal and send, by using the intermediate frequency/radio frequency device, the signal generated through soft modulation becomes an urgent problem to be resolved in application of soft modulation.

SUMMARY

Embodiments of this application provide a data sending method and apparatus.

In some embodiments (sometimes referred to as, "a first aspect"), the present disclosure provides a data sending method, including:

In some embodiments, a node generates (e.g., produces, constructs, creates) a first modulation symbol corresponding to a first modulation scheme. The node quantizes the first modulation symbol to obtain a target symbol. The target symbol corresponds to one of a plurality of constellation points of a second modulation scheme. The node preprocesses the target symbol to obtain to-be-sent data. The preprocessing includes one or more of layer mapping, antenna port mapping, precoding, or transform precoding. The node maps the to-be-sent data to a physical resource, and/or sends (e.g., transmit, provide, deliver) the to-be-sent data by using the physical resource.

According to the data sending method provided in this embodiment of this application, a soft modulation symbol generated through soft modulation is quantized to a limited quantity of constellation points before being sent. This can ensure that a generated signal meets a requirement of an intermediate frequency indicator/a radio frequency indicator.

In some embodiments, the node generates the first modulation symbol based on first data and/or second data. A mapping relationship corresponding to the first modulation scheme is met between the first modulation symbol and the first data and/or the second data. The first data includes one or more first real numbers. The first real number is greater than or equal to 0 and less than or equal to 1. The second data includes one or more second real numbers. The second real number is greater than or equal to −1 and less than or equal to 1.

In some embodiments, the mapping relationship corresponding to the first modulation scheme is one of the following:

$\tilde{Q}=1/\sqrt{2}\times[(1-2\tilde{b}_0)+j(1-2\tilde{b}_0)]$, where $\tilde{b}_0$ is one first real number included in the first data, $\tilde{Q}$ is the first modulation symbol, and j is an imaginary unit;

$\tilde{Q}=1/\sqrt{2}\times[(1-2\tilde{b}_0)+j(1-2\tilde{b}_1)]$, where $\tilde{b}_0$ and $\tilde{b}_1$ are two first real numbers included in the first data, $\tilde{Q}$ is the first modulation symbol, and j is an imaginary unit;

$\tilde{Q}=1/\sqrt{10}\times\{(1-2\tilde{b}_0)[2-(1-2\tilde{b}_2)]+j(1-2\tilde{b}_1)[2-(1-2\tilde{b}_3)]\}$, where $\tilde{b}_0$, $\tilde{b}_1$, $\tilde{b}_2$, and $\tilde{b}_3$ are four first real numbers included in the first data, $\tilde{Q}$ is the first modulation symbol, and j is an imaginary unit;

$\tilde{Q}=1/\sqrt{42}\times\{(1-2\tilde{b}_0)[4-(1-2\tilde{b}_2)[2-(1-2\tilde{b}_4)]]+j(1-2\tilde{b}_1)[4-(1-2\tilde{b}_3)[2-(1-2\tilde{b}_5)]]\}$, where $\tilde{b}_0$, $\tilde{b}_1$, $\tilde{b}_2$, $\tilde{b}_3$, $\tilde{b}_4$, and $\tilde{b}_5$ are six first real numbers included in the first data, $\tilde{Q}$ is the first modulation symbol, and j is an imaginary unit;

$\tilde{Q}=1/\sqrt{2}\times[\tilde{a}_0+j\tilde{a}_0]$, where $\tilde{a}_0$ is one second real number included in the second data, $\tilde{Q}$ is the first modulation symbol, and j is an imaginary unit;

$\tilde{Q}=1/\sqrt{2}\times[\tilde{a}_0+j\tilde{a}_1]$, where $\tilde{a}_0$ and $\tilde{a}_1$ are two second real numbers included in the second data, $\tilde{Q}$ is the first modulation symbol, and j is an imaginary unit;

$\tilde{Q}=1/\sqrt{10}\times\{(2\tilde{a}_0-\tilde{a}_0\tilde{a}_2)+j(2\tilde{a}_1-\tilde{a}_1\tilde{a}_3)\}$, where $\tilde{a}_0$, $\tilde{a}_1$, $\tilde{a}_2$, and $\tilde{a}_3$ are four second real numbers included in the second data, $\tilde{Q}$ is the first modulation symbol, and j is an imaginary unit;

$\tilde{Q}=1/\sqrt{42}\times\{(4\tilde{a}_0-2\tilde{a}_0\tilde{a}_2+\tilde{a}_0\tilde{a}_2\tilde{a}_4)+j(4\tilde{a}_1-2\tilde{a}_1\tilde{a}_3+\tilde{a}_1\tilde{a}_3\tilde{a}_5)\}$, where $\tilde{a}_0$, $\tilde{a}_1$, $\tilde{a}_2$, $\tilde{a}_3$, $\tilde{a}_4$, and ds are six second real numbers included in the second data, $\tilde{Q}$ is the first modulation symbol, and j is an imaginary unit;

$\tilde{Q}=1/\sqrt{2}\times[(1-2\tilde{b}_0)+j\tilde{a}_1]$, where $\tilde{b}_0$ is one first real number included in the first data, $\tilde{a}_1$ is one second real number included in the second data, $\tilde{Q}$ is the first modulation symbol, and j is an imaginary unit; or $\tilde{Q}=1/\sqrt{10}\times\{(1-2\tilde{b}_0)[2-\tilde{a}_2]+j(1-2\tilde{b}_1)[2-\tilde{a}_3]\}$, where $\tilde{b}_0$ and $\tilde{b}_1$ are two first real numbers included in the first data, $\tilde{a}_2$ and $\tilde{a}_3$ are two second real numbers included in the second data, $\tilde{Q}$ is the first modulation symbol, and j is an imaginary unit.

In some embodiments, the node quantizes sixth data to obtain the first data and/or the second data.

In some embodiments, the node obtains the first data and/or the second data based on sixth data. The sixth data and the first data meet $\tilde{b}_i = e^L/(1+e^L)$, where L is the sixth data, and $\tilde{b}_i$ is the first data. The sixth data and the second data meet $\tilde{a}_i = -\tanh(L/2)$, where L is the sixth data, and $\tilde{a}_i$ is the second data.

In some embodiments, the second modulation scheme is binary phase shift keying (BPSK), quadrature phase shift keying (QPSK), 16 quadrature amplitude modulation (16QAM), 64 quadrature amplitude modulation (64QAM), 256 quadrature amplitude modulation (256QAM), 512 quadrature amplitude modulation (512QAM), or 1024 quadrature amplitude modulation (1024QAM).

In some embodiments, the node receives (e.g., retrieves, obtains, acquires) first control information, and determines (e.g., identifies, assesses), based on the first control information, to quantize the first modulation symbol to obtain the target symbol. The first control information includes first indication information and/or identification information of the node. The identification information of the node indicates the node. In some embodiments, the first indication information indicates the node to quantize the first modulation symbol to obtain the target symbol; or the first indication information indicates the second modulation scheme; or the first indication information indicates the second modulation scheme, and indicates the node to quantize the first modulation symbol to obtain the target symbol. According to the method, the data sending method or soft modulation symbol quantization method according to some embodiments of the first aspect may be enabled or disabled based on a data sending requirement, and the node can be notified to use a suitable modulation scheme. This improves robustness of data sending.

In some embodiments (sometimes referred to as, "a second aspect"), this application provides a communications apparatus, which can implement one or more corresponding functions of the node in some embodiments of the first aspect. The communications apparatus includes a corresponding unit or component configured to perform the foregoing method. The unit included in the communications apparatus may be implemented by using software and/or hardware. The communications apparatus may be, for example, a terminal or a network device (such as a base station), or may be a chip, a chip system, a processor, or the like that can support a terminal or a network device in implementing the foregoing function.

In some embodiments (sometimes referred to as, "a third aspect"), this application provides a communications apparatus, including a processor. The processor is coupled to a memory. The memory is configured to store a program. When the program is executed by the processor, the communications apparatus is enabled to implement the method according to the first aspect.

In some embodiments (sometimes referred to as, "a fourth aspect"), this application provides a storage medium. The storage medium stores a computer program. When the computer program is executed by a processor, the method according to the first aspect is implemented.

In some embodiments (sometimes referred to as, "a fifth aspect"), this application provides a chip system, including a processor, configured to perform the method described in the first aspect.

DESCRIPTION OF EMBODIMENTS

Figure 1:
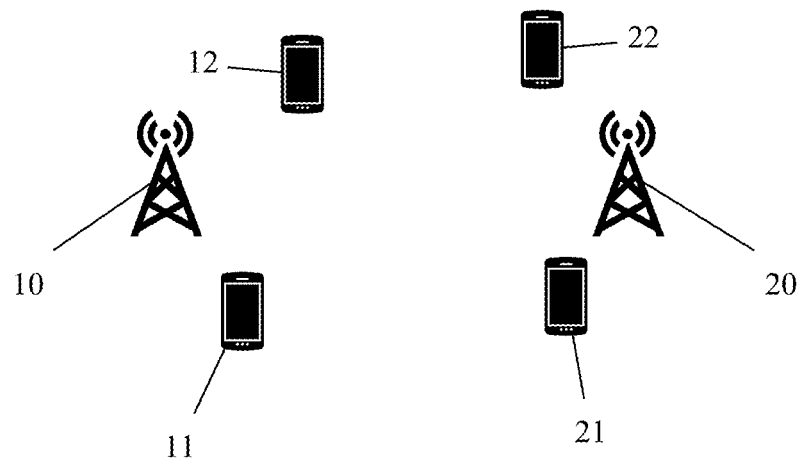
FIG. 1 is a schematic diagram of a communications system to which a method according to this application is applied.

A data sending method and apparatus provided in embodiments of this application may be applied to a communications system. For example, FIG. 1 is a schematic structural diagram of a communications system. The communications system includes one or more network devices (for clarity, the figure shows a network device 10 and a network device 20) and one or more terminal devices that communicate with the one or more network devices. A terminal device 11 and a terminal device 12 that are shown in FIG. 1 communicate with the network device 10. A terminal device 21 and a terminal device 22 that are shown in FIG. 1 communicate with the network device 20.

A technology described in the embodiments of the present application may be used for various communications systems, for example, 2G, 3G, 4G, 4.5G, and 5G communications systems, a system into which a plurality of communications systems are combined, or a future evolved network, such as a long term evolution (long term evolution, LTE) system, a new radio (new radio, NR) system, a wireless fidelity (wireless-fidelity, Wi-Fi) system, a cellular system related to the 3rd generation partnership project (3rd generation partnership project, 3GPP), and other such communications systems.

Figure 2:
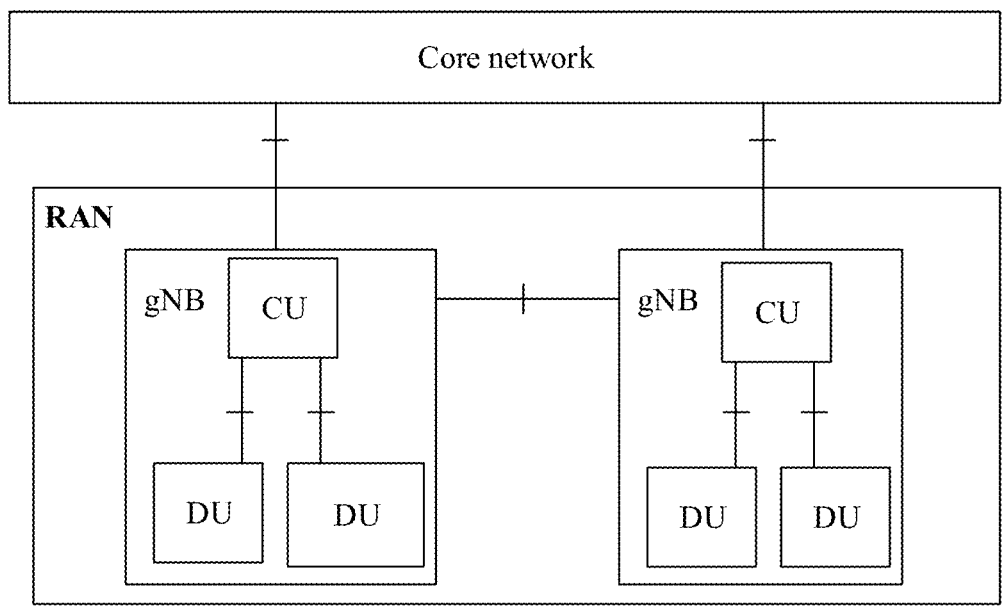
FIG. 2 is a schematic diagram of an example of an architecture of a communications system.

FIG. 2 is a schematic diagram of an example of a possible architecture of a communications system. As shown in FIG. 2, network devices in a radio access network RAN are base stations (such as gNBs) whose architectures are split into centralized units (centralized unit, CU) and distributed units (distributed unit, DU). The RAN may be connected to a core network (which may be, for example, an LTE core network or a 5G core network). The CU and DU may be understood as division of the base station from a perspective of logical functions. The CU and DU may be physically separated, or may be deployed together. A plurality of DUs may share one CU. In some embodiments, one DU may be connected to a plurality of CUs (not shown in the figure). The CU and DU may be connected to each other through an interface, for example, an F1 interface. Division into the CU and DU may be performed (e.g., executed, implemented) based on protocol layers of a wireless network. For example, functions of a packet data convergence protocol (packet data convergence protocol, PDCP) layer and a radio resource control (radio resource control, RRC) layer are set in the CU, and functions of layers such as a radio link control (radio link control, RLC) layer, a media access control (media access control, MAC) layer, and a physical (physical) layer are set in the DU. It may be understood that division into CU and DU processing functions based on such protocol layers is merely an example, and division may be alternatively performed in another manner. For example, division may be performed so that the CU or DU has functions of more protocol layers. For example, division may be alternatively performed so that the CU or DU has some of processing functions of a protocol layer. In a design, some of functions of an RLC layer and functions of protocol layers above the RLC layer are set in the CU, and a remaining function of the RLC layer and functions of protocol layers below the RLC layer are set in the DU. In some embodiments, division into CU and DU functions may be alternatively performed based on a service type or another system requirement. For example, when division is performed based on a delay, a function whose processing time needs to meet a delay requirement is set in the DU, and a function whose processing time does not need to meet the delay requirement is set in the CU. The network architecture shown in FIG. 2 may be applied to a 5G communications system, and may share one or more components or resources with an LTE system. In some embodiments, the CU may have one or more functions of the core network. One or more CUs may be disposed in a centralized manner, or may be separately disposed. For example, the CU may be disposed on a network side for ease of centralized management. The DU may have a plurality of radio frequency functions, or a radio frequency function may be remotely set.

A function of the CU may be implemented by one entity. In some embodiments, a control plane (CP) and a user plane (UP) may be further separated, that is, the control plane (CU-CP) and user plane (CU-UP) of the CU may be implemented by different functional entities. The CU-CP and the CU-UP may be coupled to the DU, to jointly implement a function of the base station.

It may be understood that the embodiments provided in this application are applicable to an architecture that is not split into a CU and DU.

In this application, a network device may be any device having a wireless transceiver function, including but not limited to an evolved NodeB (NodeB or eNB or e-NodeB, evolved NodeB) in LTE, a gNodeB (gNodeB or gNB) or a transmission reception point (transmission receiving point/transmission reception point, TRP) in NR, a base station subsequently evolved by the 3GPP, an access node in a Wi-Fi system, a wireless relay node, a wireless backhaul node, and the like. A base station may be a macro base station, a micro base station, a picocell base station, a small cell, a relay station, a balloon station, or the like. A plurality of base stations may support a network of a same technology mentioned above, or may support networks of different technologies mentioned above. The base station may include one or more co-site or non-co-site TRPs. In some embodiments, the network device may be a radio controller, a CU, and/or a DU in a cloud radio access network (cloud radio access network, CRAN) scenario. In some embodiments, the network device may be a server, a wearable device, a vehicle-mounted device, or the like. An example in which the network device is a base station is used below for description. A plurality of network devices may be base stations of a same type, or may be base stations of different types. The base station may communicate with a terminal device, or may communicate with a terminal device by using a relay station. The terminal device may communicate with a plurality of base stations of different technologies. For example, the terminal device may communicate with a base station that supports an LTE network, may communicate with a base station that supports a 5G network, or may support dual connectivity to a base station in an LTE network and a base station in a 5G network.

A terminal is a device having a wireless transceiver function, and may be deployed on land, including an indoor or outdoor manner, a handheld manner, a wearable manner, or a vehicle-mounted manner; may be deployed on water (for example, on a ship); or may be deployed in the air (for example, on an airplane, a balloon, or a satellite). The terminal may be a mobile phone (e.g., mobile phone), a tablet computer (e.g., Pad), a computer with a wireless transceiver function, a virtual reality (virtual reality, VR) terminal device, an augmented reality (augmented reality, AR) terminal device, a wireless terminal in industrial control (industrial control), a vehicle-mounted terminal device, a wireless terminal in self-driving (self-driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a wearable terminal device, or the like. An application scenario is not limited in the embodiments of this application. The terminal sometimes may also be referred to as a terminal device, user equipment (user equipment, UE), an access terminal device, a vehicle-mounted terminal, an industrial control terminal, a UE unit, a UE station, a mobile station, a remote station, a remote terminal device, a mobile device, a UE terminal device, a terminal device, a wireless communications device, a UE agent, a UE apparatus, or the like. The terminal may be fixed or mobile.

The embodiments of this application is applicable to a multi-hop data sending scenario.

Figure 3A:
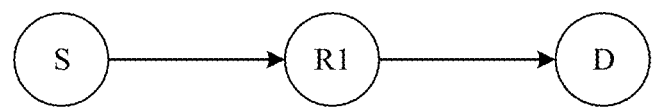
FIG. 3A shows a first possible scenario to which embodiments according to this application are applicable.

FIG. 3A is used as an example. FIG. 3A shows a possible data sending scenario to which the embodiments of this application is applicable. FIG. 3A schematically shows three nodes: one source node (namely, an S node), one relay node (namely, an R1 node, which may also be referred to as a forwarding node), and one destination node (namely, a D node). In some embodiments, the S node expects to send target data to the D node, but for some reasons (for example, the S node is excessively far from the D node, there is a blocking object between the S node and the D node, or a condition of a channel between the S node and the D node is comparatively poor), the S node needs to send the target data to the R1 node first, and/or the R1 node forwards (e.g., transmits, redirects, distributes) the target data to the D node. The data sending scenario schematically shown in FIG. 3A may be understood as a two-hop data sending scenario. In some embodiments, the first hop is from the S node to the R1 node, and/or the second hop is from the R1 node to the D node.

Figure 3B:
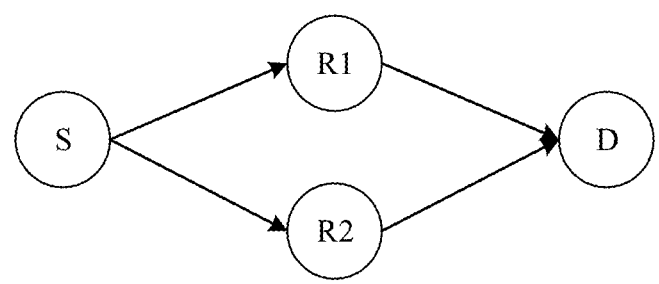
FIG. 3B shows a second possible scenario to which embodiments according to this application are applicable.

FIG. 3B is used as an example. FIG. 3B shows another possible data sending scenario to which the embodiments of this application is applicable. FIG. 3B schematically shows four nodes: one source node (namely, an S node), two relay nodes (namely, an R1 node and an R2 node, which may also be referred to as two forwarding nodes), and one destination node (namely, a D node). In some embodiments, the S node expects to send target data to the D node, but for some reasons (for example, the S node is excessively far from the D node, there is a blocking object between the S node and the D node, or a condition of a channel between the S node and/or the D node is comparatively poor), the S node needs to send the target data to the R1 node and/or the R2 node first, and then the R1 node and/or the R2 node forward/forwards the target data to the D node. The data sending scenario schematically shown in FIG. 3B may be understood as a two-hop data sending scenario. In some embodiments, the first hop is from the S node to the R1 node and/or the R2 node, and the second hop is from the R1 node and/or the R2 node to the D node.

Figure 3C:
FIG. 3C shows a third possible scenario to which embodiments according to this application are applicable.

FIG. 3C is used as an example. FIG. 3C shows another possible data sending scenario to which the embodiments of this application is applicable. FIG. 3C schematically shows four nodes: one source node (namely, an S node), two relay nodes (namely, an R1 node and an R2 node, which may also be referred to as two forwarding nodes), and one destination node (namely, a D node). The S node expects to send target data to the D node, but for some reasons (for example, the S node is excessively far from the D node, there is a blocking object between the S node and the D node, or a condition of a channel between the S node and the D node is comparatively poor), the S node needs to send the target data to the R1 node first, so that the R1 node forwards the target data to the R2 node, and/or the R2 node forwards the target data to the D node. The data sending scenario schematically shown in FIG. 3C may be understood as a three-hop data sending scenario. In some embodiments, the first hop is from the S node to the R1 node, the second hop is from the R1 node to the R2 node, and the third hop is from the R2 node to the D node.

Figure 3D:
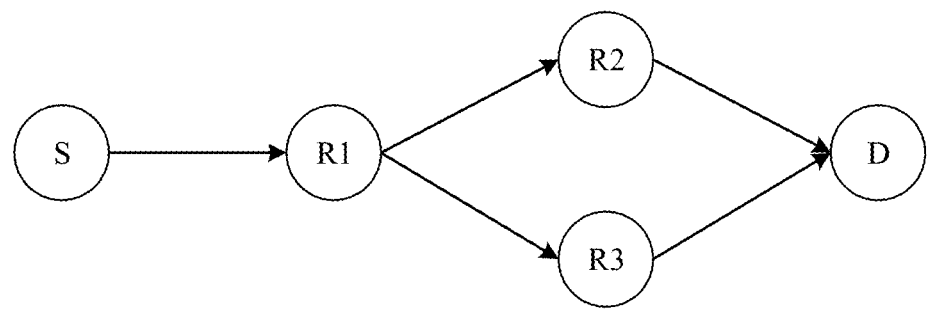
FIG. 3D shows a fourth possible scenario to which embodiments according to this application are applicable.

FIG. 3D is used as an example. FIG. 3D shows another possible data sending scenario to which the embodiments of this application is applicable. FIG. 3D schematically shows five nodes: one source node (namely, an S node), three relay nodes (namely, an R1 node, an R2 node, and an R3 node, which may also be referred to as three forwarding nodes), and one destination node (namely, a D node). In some embodiments, the S node expects to send target data to the D node, but for some reasons (for example, the S node is excessively far from the D node, there is a blocking object between the S node and the D node, or a condition of a channel between the S node and the D node is comparatively poor), the S node needs to send the target data to the R1 node first, so that the R1 node forwards the target data to the R2 node and/or the R3 node, and/or the R2 node and/or the R3 node forward/forwards the target data to the D node. The data sending scenario schematically shown in FIG. 3D may be understood as a three-hop data sending scenario. In some embodiments, the first hop is from the S node to the R1 node, the second hop is from the R1 node to the R2 node and/or the R3 node, and the third hop is from the R2 node and/or the R3 node to the D node.

It should be noted that FIG. 3A to FIG. 3D described above are merely used as examples, and a hop count and a quantity of relay nodes in a multi-hop data sending scenario are not limited in the embodiments of this application.

It may be understood that the source node may be a network device or may be a terminal, the relay node may be a network device or may be a terminal, and the destination node may be a network device or may be a terminal.

It may be understood that the embodiments of this application may be used for a single-hop data sending scenario (that is, target data is directly sent from a source node to a destination node).

The forwarding node in the foregoing multi-hop data sending scenario needs to forward the data to a next receiving node (the next receiving node may be another forwarding node, or may be the destination node). Data forwarding manners of the forwarding node include decoding forwarding (decoding forwarding, DF). In the DF manner, after receiving the data from a previous sending node, the forwarding node demodulates and/or decodes the data, and/or determines, based on whether the decoding is correct, whether to forward the data. If the decoding is correct, the forwarding node may re-encode and re-modulate the decoded data, and send the re-encoded and re-modulated data to the next receiving node. If the decoding is incorrect, the forwarding node does not forward the data. In the DF manner, when the forwarding node incorrectly decodes the data that is from the previous sending node, the forwarding node cannot forward the data, and consequently, forwarding performance is degraded.

Soft modulation can resolve the foregoing main problem of DF. By sending data generated through soft modulation, the forwarding node can still forward the data when the forwarding node incorrectly decodes the data that is from the previous sending node. This improves forwarding performance. However, a signal generated through soft modulation may not meet a requirement of an intermediate frequency indicator of an intermediate frequency device/a radio frequency indicator of a radio frequency device. For example, soft modulation may cause an excessively large peak to average power ratio (peak to average power ratio, PAPR) of the generated signal, or soft modulation may cause an excessively large error vector magnitude (error vector magnitude, EVM) of the generated signal. As a result, it is possible that the signal generated through soft modulation cannot be sent by using the intermediate frequency/radio frequency device. Therefore, how to ensure that the generated signal meets the requirement of the intermediate frequency/radio frequency indicator and send, by using the intermediate frequency/radio frequency device, the signal generated through soft modulation becomes an urgent problem to be resolved in application of soft modulation.

According to the data sending method and apparatus provided in the embodiments of this application, a soft modulation symbol generated through soft modulation may be quantized to a limited quantity of constellation points before being sent. This can ensure that a generated signal meets a requirement of an intermediate frequency indicator/a radio frequency indicator.

The following describes the technical solutions of this application in detail by using specific embodiments with reference to the accompanying drawings. The following several specific embodiments and implementations may be combined with each other, and a same or similar concept or process may not be described repeatedly in some embodiments. It should be understood that functions explained in this application may be implemented by using an independent hardware circuit, by using software that runs in combination with a processor/microprocessor or a general-purpose computer, by using an application-specific integrated circuit, and/or by using one or more digital signal processors. When this application is described as a method, the method may be implemented in a computer processor and a memory coupled to the processor.

Figure 4:
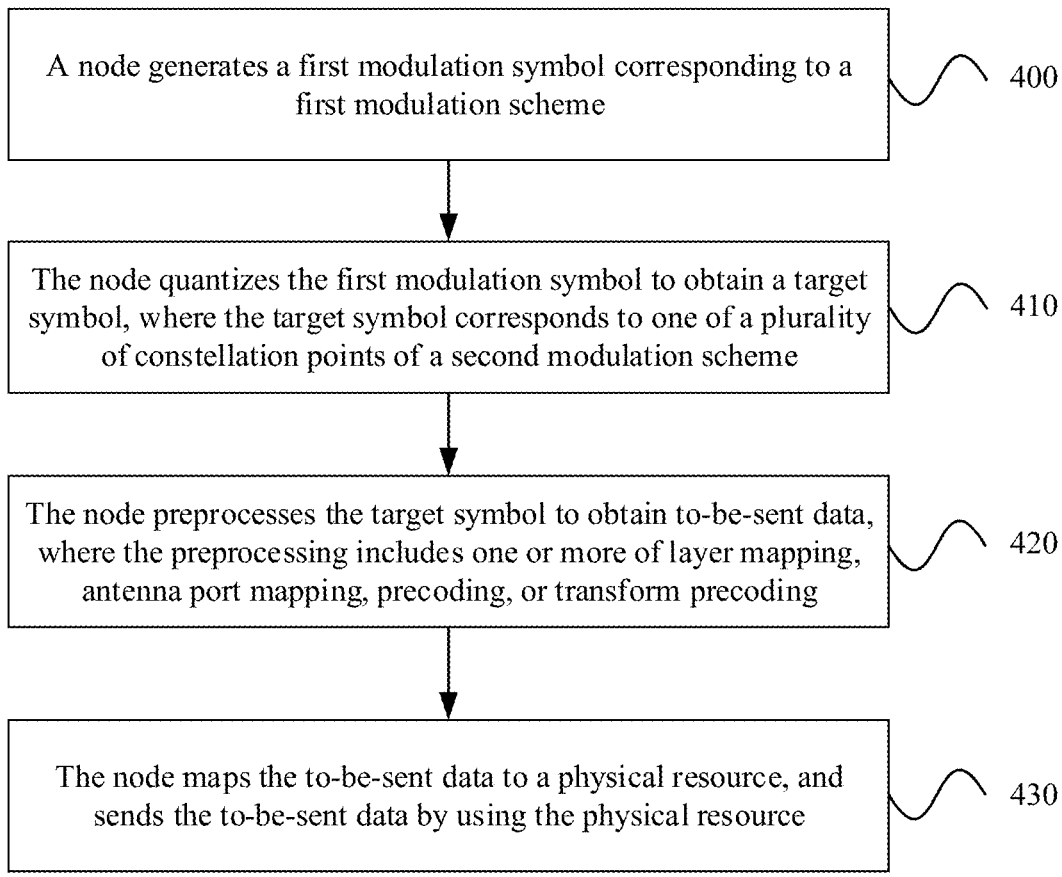
FIG. 4 is a schematic flowchart of a data sending method according to an embodiment of this application.

FIG. 4 is a schematic flowchart of a data sending method according to an embodiment of this application. It may be understood that sent data in the data sending method in this embodiment of this application may be data that includes control information, may be data that includes service information, or may be data that not only includes control information but also includes service information. As shown in FIG. 4, the method in this embodiment may include the following parts:

Part 400: A node generates a first modulation symbol corresponding to a first modulation scheme. It may be understood that the node in this embodiment of this application may be a terminal, or may be a network device.

Part 410: The node quantizes the first modulation symbol to obtain a target symbol, where the target symbol corresponds to one of a plurality of constellation points of a second modulation scheme.

Part 420: The node preprocesses the target symbol to obtain to-be-sent data, where the preprocessing includes one or more of layer mapping, antenna port mapping, precoding, or transform precoding. The preprocessing may be understood as a processing operation that needs to be completed before the target symbol is mapped to a physical resource.

Part 430: The node maps the to-be-sent data to the physical resource, and sends the to-be-sent data by using the physical resource. The physical resource may include one or more of a time domain resource, a frequency domain resource, a code domain resource, or a space domain resource. For example, the time domain resource included in the physical resource may include at least one frame, at least one sub-frame (sub-frame), at least one slot (slot), at least one mini-slot (mini-slot), or at least one time domain symbol. For example, the frequency domain resource included in the physical resource may include at least one carrier (carrier), at least one component carrier (component carrier, CC), at least one bandwidth part (bandwidth part, BWP), at least one resource block group (resource block group, RBG), at least one physical resource block group (physical resource-block group, PRG), at least one resource block (resource block, RB), or at least one sub-carrier (sub-carrier, SC). For example, the space domain resource included in the physical resource may include at least one beam, at least one port, at least one antenna port, or at least one layer/spatial layer. For example, the code domain resource included in the physical resource may include at least one orthogonal cover code (orthogonal cover code, OCC) or at least one non-orthogonal multiple access (non-orthogonal multiple access, NOMA) code.

It may be understood that the physical resource may be a physical resource of a baseband, and the physical resource of the baseband may be used by a baseband chip; or the physical resource may be a physical resource of an air interface; or the physical resource may be a physical resource of intermediate frequency or radio frequency.

Figure 5:
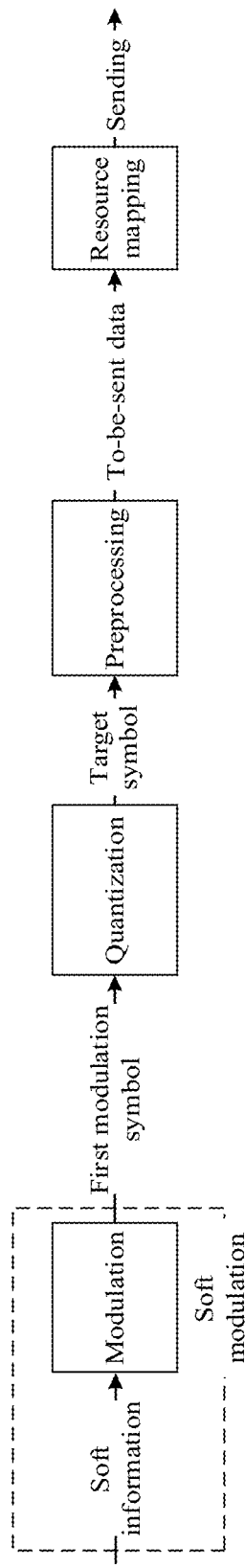
FIG. 5 is a schematic block diagram of quantizing a soft modulation symbol according to an embodiment of this application.

The embodiment of this application schematically shown in FIG. 4 may be understood as a method for quantizing a soft modulation symbol generated through soft modulation to a hard modulation symbol, and sending the hard modulation symbol obtained through quantization. FIG. 5 is a schematic block diagram of quantizing a soft modulation symbol generated through soft modulation to a hard modulation symbol, and sending the hard modulation symbol obtained through quantization according to an embodiment of this application. In FIG. 5, a soft modulation process is as follows: Soft information is input for modulation, and a first modulation symbol is output after soft modulation. The first modulation symbol may be referred to as a soft modulation symbol. After the first modulation symbol is obtained through soft modulation, the first modulation symbol is quantized to obtain a target symbol. The target symbol may be referred to as a hard modulation symbol. In some embodiments, after the target symbol is obtained, the target symbol is preprocessed (a preprocessing process includes one or more of layer mapping, antenna port mapping, precoding, or transform precoding) to obtain to-be-sent data. In some embodiments, the to-be-sent data is mapped to a physical resource (that is, resource mapping is performed), and the to-be-sent data is sent by using the physical resource.

It may be understood that the soft information shown in FIG. 5 may be soft information directly obtained by a forwarding node in a demodulation and/or decoding process of data that is from a previous sending node, or may be soft information further obtained by processing soft information that is directly obtained in a demodulation and/or decoding process. The soft information directly obtained in the data demodulation and/or decoding process may be a probability of one or more modulation symbols obtained through demodulation, and/or a probability of one or more decoded bits obtained through decoding.

According to the method provided in this embodiment of this application, the soft modulation symbol generated through soft modulation may be quantized to a limited quantity of constellation points before being sent, so as to obtain a comparatively low PAPR and/or a comparatively low EVM. In this way, it can be ensured that requirements of an intermediate frequency indicator and a radio frequency indicator are both met, so that a signal generated through soft modulation can be sent by using an intermediate frequency device/a radio frequency device.

The first modulation scheme in the foregoing part 400 may be understood as a modulation scheme used for soft modulation that is schematically shown in FIG. 5. The soft modulation symbol (that is, the first modulation symbol shown in FIG. 5) can be obtained through soft modulation.

In some embodiments, the node generates the first modulation symbol based on first data and/or second data. In some embodiments, a mapping relationship corresponding to the first modulation scheme is met between the first modulation symbol and the first data and/or the second data. The first data includes one or more first real numbers. In some embodiments, the first real number is greater than or equal to 0 and less than or equal to 1. The first real number may be referred to as soft bit information (that is, a possible form of the soft information schematically shown in FIG. 5). The second data includes one or more second real numbers. In some embodiments, the second real number is greater than or equal to −1 and less than or equal to 1. The second real number may be referred to as soft symbol information (that is, a possible form of the soft information schematically shown in FIG. 5).

That a mapping relationship is met between the first modulation symbol and the first data and/or the second data (different mapping relationships correspond to different modulation schemes) may be understood as that a function relationship is met between the first modulation symbol and the first data and/or the second data. The mapping relationship may be understood as a mapping relationship implemented by a modulation module in FIG. 5.

In a possible implementation in which the mapping relationship is met between the first modulation symbol and the first data and/or the second data, the mapping relationship is met between the first modulation symbol and the first data.

For example, the mapping relationship is $\tilde{Q}=1/\sqrt{2}\times[(1-2\tilde{b}_0)+j(1-2\tilde{b}_0)]$, where $\tilde{b}_0$ is one first real number included in the first data, $\tilde{Q}$ is the first modulation symbol, and j is an imaginary unit. The mapping relationship may be understood as a mapping relationship met between the first modulation symbol and the first data when the modulation module in FIG. 5 uses a binary phase shift keying (binary phase shift keying, BPSK) modulation scheme. In some embodiments, the node inputs the first real number $\tilde{b}_0$ based on the mapping relationship, and/or generates one complex-number first modulation symbol $\tilde{Q}$. According to the foregoing example method, soft modulation may be implemented by using the BPSK modulation scheme (such soft modulation may also be referred to as BPSK soft modulation). This reduces implementation complexity of soft modulation.

For example, the mapping relationship is $\tilde{Q}=1/\sqrt{2}\times[(1-2\tilde{b}_0)+j(1-2\tilde{b}_1)]$, where $\tilde{b}_0$ and $\tilde{b}_1$ are two first real numbers included in the first data, $\tilde{Q}$ is the first modulation symbol, and j is an imaginary unit. The mapping relationship may be understood as a mapping relationship met between the first modulation symbol and the first data when the modulation module in FIG. 5 uses a quadrature phase shift keying (quadrature phase shift keying, QPSK) modulation scheme. In some embodiments, the node inputs the first real numbers $\tilde{b}_0$ and $\tilde{b}_1$ based on the mapping relationship, and/or generates one complex-number first modulation symbol $\tilde{Q}$. It may be understood that $\tilde{b}_0$ may not be equal to $\tilde{b}_1$, or may be equal to $\tilde{b}_1$. A magnitude relationship between the first real numbers $\tilde{b}_0$ and $\tilde{b}_1$ is not limited in this application. According to the foregoing example method, soft modulation may be implemented by using the QPSK modulation scheme (such soft modulation may also be referred to as QPSK soft modulation). This reduces implementation complexity of soft modulation.

For example, the mapping relationship is $\tilde{Q}=1/\sqrt{10}\times\{(1-2\tilde{b}_0)[2-(1-2\tilde{b}_2)]+j(1-2\tilde{b}_1)[2-(1-2\tilde{b}_3)]\}$, where $\tilde{b}_0$, $\tilde{b}_1$, $\tilde{b}_2$, and $\tilde{b}_3$ are four first real numbers included in the first data, $\tilde{Q}$ is the first modulation symbol, and j is an imaginary unit. The mapping relationship may be understood as a mapping relationship met between the first modulation symbol and the first data when the modulation module in FIG. 5 uses a 16 quadrature amplitude modulation (16 quadrature amplitude modulation, 16QAM) modulation scheme. In some embodiments, the node inputs the first real numbers $\tilde{b}_0$, $\tilde{b}_1$, $\tilde{b}_2$, and $\tilde{b}_3$ based on the mapping relationship, and/or generates one complex-number first modulation symbol $\tilde{Q}$. It may be understood that a magnitude relationship between the first real numbers $\tilde{b}_0$, $\tilde{b}_1$, $\tilde{b}_2$, and $\tilde{b}_3$ is not limited in this application. According to the foregoing example method, soft modulation may be implemented by using the 16QAM modulation scheme (such soft modulation may also be referred to as 16QAM soft modulation). This reduces implementation complexity of soft modulation.

For example, the mapping relationship is $\tilde{Q}=1/\sqrt{42}\times\{(1-2\tilde{b}_0)[4-(1-2\tilde{b}_2)[2-(1-2\tilde{b}_4)]]+j(1-2\tilde{b}_1)[4-(1-2\tilde{b}_3)[2-(1-2\tilde{b}_5)]]\}$, where $\tilde{b}_0$, $\tilde{b}_1$, $\tilde{b}_2$, $\tilde{b}_3$, $\tilde{b}_4$, and $\tilde{b}_5$ are six first real numbers included in the first data, $\tilde{Q}$ is the first modulation symbol, and j is an imaginary unit. The mapping relationship may be understood as a mapping relationship met between the first modulation symbol and the first data when the modulation module in FIG. 5 uses a 64 quadrature amplitude modulation (64 quadrature amplitude modulation, 64QAM) modulation scheme. The node inputs the first real numbers $\tilde{b}_0$, $\tilde{b}_1$, $\tilde{b}_2$, $\tilde{b}_3$, $\tilde{b}_4$, and $\tilde{b}_5$ based on the mapping relationship, and generates one complex-number first modulation symbol $\tilde{Q}$. It may be understood that a magnitude relationship between the first real numbers $\tilde{b}_0$, $\tilde{b}_1$, $\tilde{b}_2$, $\tilde{b}_3$, $\tilde{b}_4$, and $\tilde{b}_5$ is not limited in this application. According to the foregoing example method, soft modulation may be implemented by using the 64QAM modulation scheme (such soft modulation may also be referred to as 64QAM soft modulation). This reduces implementation complexity of soft modulation.

It may be understood that the mapping relationship in the foregoing implementation may alternatively be a mapping relationship that corresponds to another modulation scheme and that is met between the first modulation symbol and the first data. For example, the another modulation scheme may be 256QAM, 512QAM, 1024QAM, or π/2-BPSK. This is not limited in this embodiment of this application.

In a possible implementation in which the mapping relationship is met between the first modulation symbol and the first data and/or the second data, the mapping relationship is met between the first modulation symbol and the second data.

For example, the mapping relationship is $\tilde{Q}=1/\sqrt{2}\times[\tilde{a}_0+j\tilde{a}_0]$, where $\tilde{a}_0$ is one second real number included in the second data, $\tilde{Q}$ is the first modulation symbol, and j is an imaginary unit. The mapping relationship may be understood as a mapping relationship met between the first modulation symbol and the second data when the modulation module in FIG. 5 uses a BPSK modulation scheme. In some embodiments, the node inputs the second real number $\tilde{a}_0$ based on the mapping relationship, and/or generates one complex-number first modulation symbol $\tilde{Q}$. According to the foregoing example method, soft modulation may be implemented by using the BPSK modulation scheme (such soft modulation may also be referred to as BPSK soft modulation). This reduces implementation complexity of soft modulation.

For example, the mapping relationship is $\tilde{Q}=1/\sqrt{2}\times[\tilde{a}_0+j\tilde{a}_1]$, where $\tilde{a}_0$ and $\tilde{a}_1$ are two second real numbers included in the second data, $\tilde{Q}$ is the first modulation symbol, and j is an imaginary unit. The mapping relationship may be understood as a mapping relationship met between the first modulation symbol and the second data when the modulation module in FIG. 5 uses a QPSK modulation scheme. In some embodiments, the node inputs the second real numbers $\tilde{a}_0$ and $\tilde{a}_1$ based on the mapping relationship, and/or generates one complex-number first modulation symbol $\tilde{Q}$. It may be understood that $\tilde{a}_0$ may not be equal to $\tilde{a}_1$, or may be equal to $\tilde{a}_1$. A magnitude relationship between the second real numbers $\tilde{a}_0$ and $\tilde{a}_1$ is not limited in this application. According to the foregoing example method, soft modulation may be implemented by using the QPSK modulation scheme (such soft modulation may also be referred to as QPSK soft modulation). This reduces implementation complexity of soft modulation.

For example, the mapping relationship is $\tilde{Q}=1/\sqrt{10}\times\{(2\tilde{a}_0-\tilde{a}_0\tilde{a}_2)+j(2\tilde{a}_1-\tilde{a}_1\tilde{a}_3)\}$, where $\tilde{a}_0$, $\tilde{a}_1$, $\tilde{a}_2$, and $\tilde{a}_3$ are four second real numbers included in the second data, $\tilde{Q}$ is the first modulation symbol, and j is an imaginary unit. The mapping relationship may be understood as a mapping relationship met between the first modulation symbol and the second data when the modulation module in FIG. 5 uses a 16QAM modulation scheme. In some embodiments, the node inputs the second real numbers $\tilde{a}_0$, $\tilde{a}_1$, $\tilde{a}_2$, and $\tilde{a}_3$ based on the mapping relationship, and/or generates one complex-number first modulation symbol $\tilde{Q}$. It may be understood that a magnitude relationship between the second real numbers $\tilde{a}_0$, $\tilde{a}_1$, $\tilde{a}_2$, and $\tilde{a}_3$ is not limited in this application. According to the foregoing example method, soft modulation may be implemented by using the 16QAM modulation scheme (such soft modulation may also be referred to as 16QAM soft modulation). This reduces implementation complexity of soft modulation.

For example, the mapping relationship is $\tilde{Q}=1/\sqrt{42}\times\{(4\tilde{a}_0-2\tilde{a}_0\tilde{a}_2+\tilde{a}_0\tilde{a}_2\tilde{a}_4)+j(4\tilde{a}_1-2\tilde{a}_1\tilde{a}_3+\tilde{a}_1\tilde{a}_3\tilde{a}_5)\}$, where $\tilde{a}_0$, $\tilde{a}_1$, $\tilde{a}_2$, $\tilde{a}_3$, $\tilde{a}_4$, and $\tilde{a}_5$ are six second real numbers included in the second data, $\tilde{Q}$ is the first modulation symbol, and j is an imaginary unit. The mapping relationship may be understood as a mapping relationship met between the first modulation symbol and the second data when the modulation module in FIG. 5 uses a 64QAM modulation scheme. In some embodiments, the node inputs the second real numbers $\tilde{a}_0$, $\tilde{a}_1$, $\tilde{a}_2$, $\tilde{a}_3$, $\tilde{a}_4$, and $\tilde{a}_5$ based on the mapping relationship, and/or generates one complex-number first modulation symbol $\tilde{Q}$. It may be understood that a magnitude relationship between the second real numbers $\tilde{a}_0$, $\tilde{a}_1$, $\tilde{a}_2$, $\tilde{a}_3$, $\tilde{a}_4$, and $\tilde{a}_5$ is not limited in this application. According to the foregoing example method, soft modulation may be implemented by using the 64QAM modulation scheme (such soft modulation may also be referred to as 64QAM soft modulation). This reduces implementation complexity of soft modulation.

It may be understood that the mapping relationship in the foregoing implementation may alternatively be a mapping relationship that corresponds to another modulation scheme and that is met between the first modulation symbol and the second data. For example, the another modulation scheme may be 256QAM, 512QAM, 1024QAM, or π/2-BPSK. This is not limited in this embodiment of this application.

In a possible implementation in which the mapping relationship is met between the first modulation symbol and the first data and/or the second data, the mapping relationship is met between the first modulation symbol, and the first data and the second data.

For example, the mapping relationship is $\tilde{Q}=1/\sqrt{2}\times[(1-2\tilde{b}_0)+j\tilde{a}_1]$, where $\tilde{b}_0$ is one first real number included in the first data, $\tilde{a}_1$ is one second real number included in the second data, $\tilde{Q}$ is the first modulation symbol, and j is an imaginary unit. The mapping relationship may be understood as a mapping relationship met between the first modulation symbol, and the first data and the second data when the modulation module in FIG. 5 uses a QPSK modulation scheme. In some embodiments, the node inputs the first real number $\tilde{b}_0$ and the second real number $\tilde{a}_1$ based on the mapping relationship, and/or generates one complex-number first modulation symbol $\tilde{Q}$. It may be understood that $\tilde{a}_1$ may not be equal to $\tilde{b}_0$, or may be equal to $\tilde{b}_0$. A magnitude relationship between the first real number $\tilde{b}_0$ and the second real number $\tilde{a}_1$ is not limited in this application. According to the foregoing example method, soft modulation may be implemented by using the QPSK modulation scheme (such soft modulation may also be referred to as QPSK soft modulation). This reduces implementation complexity of soft modulation.

For example, the mapping relationship is $\tilde{Q}=1/\sqrt{10}\times\{(1-2\tilde{b}_0)[2-\tilde{a}_2]+j(1-2\tilde{b}_1)[2-\tilde{a}_3]\}$, where $\tilde{b}_0$ and $\tilde{b}_1$ are two first real numbers included in the first data, $\tilde{a}_2$ and $\tilde{a}_3$ are two second real numbers included in the second data, $\tilde{Q}$ is the first modulation symbol, and j is an imaginary unit. The mapping relationship may be understood as a mapping relationship met between the first modulation symbol, and the first data and the second data when the modulation module in FIG. 5 uses a 16QAM modulation scheme. In some embodiments, the node inputs the first real numbers $\tilde{b}_0$ and $\tilde{b}_1$ and the second real numbers $\tilde{a}_2$ and $\tilde{a}_3$ based on the mapping relationship, and/or generates one complex-number first modulation symbol $\tilde{Q}$. It may be understood that a magnitude relationship between the first real numbers $\tilde{b}_0$ and $\tilde{b}_1$ and the second real numbers $\tilde{a}_2$ and $\tilde{a}_3$ is not limited in this application. According to the foregoing example method, soft modulation may be implemented by using the 16QAM modulation scheme (such soft modulation may also be referred to as 16QAM soft modulation). This reduces implementation complexity of soft modulation.

It may be understood that the mapping relationship in the foregoing implementation may alternatively be a mapping relationship that corresponds to another modulation scheme and that is met between the first modulation symbol, and the first data and the second data. For example, the another modulation scheme may be BPSK, 64QAM, 256QAM, 512QAM, 1024QAM, or π/2-BPSK. This is not limited in this embodiment of this application. In addition, it may be understood that specific locations of the first data and the second data in the mapping relationship are not limited in the foregoing implementation. Any locations of the first data and the second data in the mapping relationship fall within the protection scope of the embodiments of this application, provided that both the first data and the second data exist in the mapping relationship.

In some embodiments, in the foregoing part 400, the node may obtain the first data and/or the second data based on sixth data. The sixth data may be understood as original soft information obtained by the node by demodulating or decoding data that is from a previous sending node. In some embodiments, the sixth data includes one or more sixth real numbers, and a value range of the sixth real number is from A to B. It may be understood that the range from A to B is generally greater than a range from 0 to 1 or a range from −1 to 1. For example, A represents negative infinity and B represents positive infinity, or A represents −30 and B represents 30. Specific values of A and B are not limited in this embodiment of this application.

In the foregoing part 400, in a possible implementation in which the node obtains the first data based on the sixth data, the sixth data and the first data meet $\tilde{b}_i=e^L/(1+e^L)$, where L is the sixth data (which may also be understood as one sixth real number included in the sixth data), $\breve{b}_i$ is the first data (which may also be understood as one first real number included in the first data), and $\breve{b}_i$ is a real number greater than or equal to 0 and less than or equal to 1. According to this implementation, the original soft information that is obtained by the forwarding node and whose value range may be quite large (for example, a value range from negative infinity to positive infinity) can be compressed into the range from 0 to 1, so that complexity of a subsequent operation (for example, modulation) can be reduced.

In the foregoing part 400, in another possible implementation in which the node obtains the first data based on the sixth data, the node quantizes the sixth data to obtain the first data. For example, the sixth data may be quantized by using a table shown in Table 1, to obtain the first data. A left column in Table 1 shows several value intervals of the sixth data L (which may also be understood as one sixth real number included in the sixth data), where A and B respectively represent a lower limit value and an upper limit value of L, $c_k$ represents a positive real number, $-c_k$ represents a negative real number, k is an integer greater than or equal to 0 and less than or equal to N, [a, b] represents an interval in which a value is greater than or equal to a and less than or equal to b, and [a, b) represents an interval in which a value is greater than or equal to a and less than b. A right column in Table 1 shows several values of the first data $\breve{b}_i$ (which may also be understood as one first real number included in the first data), where $d_l$ represents a real number greater than or equal to 0 and less than or equal to 1, and l is an integer greater than or equal to 0 and less than or equal to 2N. In some embodiments, the node obtains the sixth data L; determines, from the left column of Table 1, a value interval within which a value of the sixth data L falls; and/or determines that a value, in the right column of Table 1, corresponding to the value interval is a value of the first data $\breve{b}_i$ obtained by quantizing the sixth data L. It may be understood that Table 1 shows only an example of a possible representation form of a correspondence between the sixth data L and the first data $\breve{b}_i$. A specific representation form of the correspondence between the sixth data L and the first data $\breve{b}_i$ is not limited in this embodiment of this application. Other possible representation forms of the correspondence also fall within the protection scope of the embodiments of this application. In addition, it may be understood that the value intervals of the sixth data L that are shown in Table 1 may be obtained by evenly dividing an interval [A, B], or may be obtained by unevenly dividing an interval [A, B]. This is not limited in this embodiment of this application. According to this implementation, the original soft information that is obtained by the forwarding node and whose value range is quite large (for example, a value range from negative infinity to positive infinity) can be compressed into the range from 0 to 1 through simple quantization, so that the forwarding node does not need to perform a complex calculation, and complexity of a subsequent operation (for example, modulation) can be reduced.

TABLE 1

| Value interval of the sixth data L (which may also be understood as one sixth real number included in the sixth data) | Value of the first data $\breve{b}_i$ (which may also be understood as one first real number included in the first data) |
|---|---|
| $[c_N, B]$ | $d_{2N}$ |
| $[c_{N-1}, c_N)$ | $d_{2N-1}$ |
| ... | ... |
| $[-c_N, -c_{N-1})$ | $d_1$ |
| $[A, -c_N)$ | $d_0$ |

In the foregoing part 400, in a possible implementation in which the node obtains the second data based on the sixth data, the sixth data and the second data meet $\tilde{a}_i = -\tanh(L/2)$, where L is the sixth data (which may also be understood as one sixth real number included in the sixth data), $\tilde{a}_i$ is the second data (which may also be understood as one second real number included in the second data), and $\tilde{a}_i$ is a real number greater than or equal to −1 and less than or equal to 1. According to this implementation, the original soft information that is obtained by the forwarding node and whose value range is quite large (for example, a value range from negative infinity to positive infinity) can be compressed into the range from −1 to 1, so that complexity of a subsequent operation (for example, modulation) can be reduced.

In the foregoing part 400, in another possible implementation in which the node obtains the second data based on the sixth data, the node quantizes the sixth data to obtain the second data. For example, the sixth data may be quantized by using a table shown in Table 2, to obtain the second data. A left column in Table 2 shows several value intervals of the sixth data L (which may also be understood as one sixth real number included in the sixth data), where A' and B' respectively represent a lower limit value and an upper limit value of L, $c_k'$ represents a positive real number, $-c_k'$ represents a negative real number, k is an integer greater than 0 and less than or equal to N', [a', b'] represents an interval in which a value is greater than or equal to a' and less than or equal to b', and [a', b') represents an interval in which a value is greater than or equal to a' and less than b'. A right column in Table 2 shows several values of the second data $\tilde{a}_i$ (which may also be understood as one second real number included in the second data), where $d_l'$ represents a real number greater than or equal to 0 and less than or equal to 1, $-d_l'$ represents a real number greater than or equal to −1 and less than or equal to 0, and l is an integer greater than or equal to 0 and less than or equal to N'. In some embodiments, the node obtains the sixth data L; determines, from the left column of Table 2, a value interval within which a value of the sixth data L falls; and/or determines that a value, in the right column of Table 2, corresponding to the value interval is a value of the second data $\tilde{a}_i$ obtained by quantizing the sixth data L. It may be understood that Table 2 shows only an example of a possible representation form of a correspondence between the sixth data L and the second data $\tilde{a}_i$. A specific representation form of the correspondence between the sixth data L and the second data $\tilde{a}_i$ is not limited in this embodiment of this application. Other possible representation forms of the correspondence also fall within the protection scope of the embodiments of this application. In addition, it may be understood that the value intervals of the sixth data L that are shown in Table 2 may be obtained by evenly dividing an interval [A', B'], or may be obtained by unevenly dividing an interval [A', B']. This is not limited in this embodiment of this application. According to this implementation, the original soft information that is obtained by the forwarding node and whose value range is quite large (for example, a value range from negative infinity to positive infinity) can be compressed into the range from −1 to 1 through simple quantization, so that the forwarding node does not need to perform a complex calculation, and complexity of a subsequent operation (for example, modulation) can be reduced.

TABLE 2

| Value interval of the sixth data L (which may also be understood as one sixth real number included in the sixth data) | Value of the second data $\tilde{a}_i$ (which may also be understood as one second real number included in the second data) |
|---|---|
| $[c'_{N'}, B']$ | $d'_{N'}$ |
| $[c'_{N'-1}, c'_{N'})$ | $d'_{N'-1}$ |
| ... | ... |
| $[c'_1, c'_2)$ | $d'_1$ |
| $[-c'_1, c'_1)$ | $d'_0$ |
| $[-c'_2, -c'_1)$ | $-d'_1$ |
| ... | ... |
| $[-c'_{N'}, -c'_{N'-1})$ | $-d'_{N'-1}$ |
| $[A', -c'_{N'})$ | $-d'_{N'}$ |

In the foregoing part 400, in a possible implementation in which the node obtains the first data and the second data based on the sixth data, the sixth data and the first data meet $\tilde{b}_i = e^L/(1+e^L)$, and the sixth data and the second data meet $\tilde{a}_i = -\tanh(L/2)$, where L is the sixth data (which may also be understood as one sixth real number included in the sixth data); $\tilde{b}_i$ is the first data (which may also be understood as one first real number included in the first data), and $\tilde{b}_i$ is a real number greater than or equal to 0 and less than or equal to 1; and $\tilde{a}_i$ is the second data (which may also be understood as one second real number included in the second data), and $\tilde{a}_i$ is a real number greater than or equal to −1 and less than or equal to 1. According to this implementation, the original soft information that is obtained by the forwarding node and whose value range is quite large (for example, a value range from negative infinity to positive infinity) can be compressed into the range from 0 to 1 and the range from −1 to 1, so that complexity of a subsequent operation (for example, modulation) can be reduced.

In the foregoing part 400, in another possible implementation in which the node obtains the first data and the second data based on the sixth data, the node quantizes the sixth data to obtain the first data and the second data. For example, the sixth data may be quantized by using the tables shown in Table 1 and Table 2, to obtain the first data and the second data. For a specific quantization process, refer to the foregoing descriptions of Table 1 and Table 2. Details are not described herein again. According to this implementation, the original soft information that is obtained by the forwarding node and whose value range is quite large (for example, a value range from negative infinity to positive infinity) can be compressed into the range from 0 to 1 and the range from −1 to 1 through simple quantization, so that the forwarding node does not need to perform a complex calculation, and complexity of a subsequent operation (for example, modulation) can be reduced.

In the foregoing part 400, in another possible implementation in which the node obtains the first data and the second data based on the sixth data, the node quantizes the sixth data to obtain the first data, and the sixth data and the second data meet $\tilde{a}_i = -\tanh(L/2)$, where L is the sixth data (which may also be understood as one sixth real number included in the sixth data), $\tilde{a}_i$ is the second data (which may also be understood as one second real number included in the second data), and $\tilde{a}_i$ is a real number greater than or equal to −1 and less than or equal to 1. For example, the sixth data may be quantized by using the table shown in Table 1, to obtain the first data. For a specific quantization process, refer to the foregoing descriptions of Table 1. Details are not described herein again. According to this implementation, the original soft information that is obtained by the forwarding node and whose value range is quite large (for example, a value range from negative infinity to positive infinity) can be compressed into the range from 0 to 1 and the range from −1 to 1, so that the forwarding node does not need to perform a complex calculation, and complexity of a subsequent operation (for example, modulation) can be reduced.

In the foregoing part 400, in another possible implementation in which the node obtains the first data and the second data based on the sixth data, the node quantizes the sixth data to obtain the second data, and the sixth data and the first data meet $\tilde{b}_i = e^L/(1+e^L)$, where L is the sixth data (which may also be understood as one sixth real number included in the sixth data), $\tilde{b}_i$ is the first data (which may also be understood as one first real number included in the first data), and $\tilde{b}_i$ is a real number greater than or equal to 0 and less than or equal to 1. For example, the sixth data may be quantized by using the table shown in Table 2, to obtain the second data. For a specific quantization process, refer to the foregoing descriptions of Table 2. Details are not described herein again. According to this implementation, the original soft information that is obtained by the forwarding node and whose value range is quite large (for example, a value range from negative infinity to positive infinity) can be compressed into the range from 0 to 1 and the range from −1 to 1, so that the forwarding node does not need to perform a complex calculation, and complexity of a subsequent operation (for example, modulation) can be reduced.

Through soft modulation described in the foregoing part 400, more possible modulation constellation points can be generated on a complex plane.

The QPSK modulation scheme is used as an example. Through QPSK hard modulation, only one of four constellation points (such as four constellation points shown in FIG. 6A) on a complex plane can be generated. Through soft modulation described in the foregoing part 400, four constellation points on a complex plane and one of any constellation points on a plane including the four constellation points (as shown in FIG. 6A, the any constellation points on the plane including the four constellation points are represented by a shaded region formed by slashes) can be generated through QPSK soft modulation.

The 16QAM modulation scheme is used as an example. Through 16QAM hard modulation, only one of 16 constellation points (such as 16 constellation points shown in FIG. 6B) on a complex plane can be generated. Through soft modulation described in the foregoing part 400, 16 constellation points on a complex plane and one of any constellation points on a plane including constellation points at four corners of the 16 constellation points (as shown in FIG. 6B, the any constellation points on the plane including the constellation points at the four corners are represented by a shaded region formed by slashes) can be generated through 16QAM soft modulation.

Figure 6A:
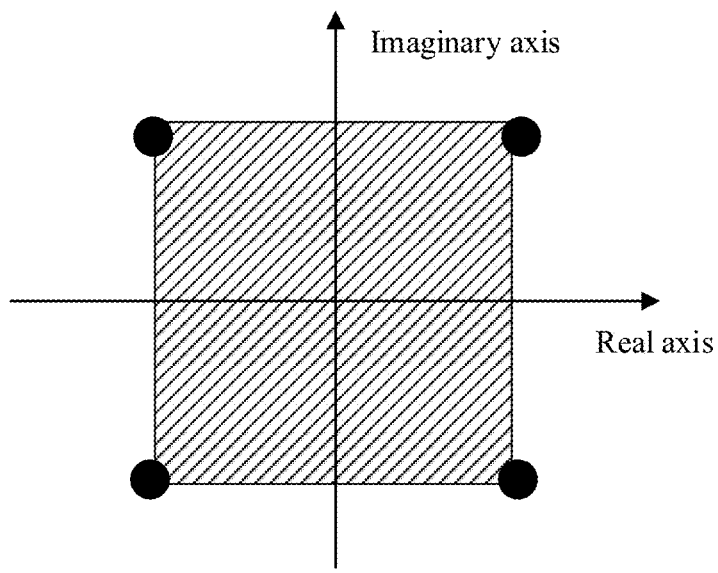
FIG. 6A is a schematic diagram of modulation constellation points of soft modulation according to an embodiment of this application.
Figure 6B:
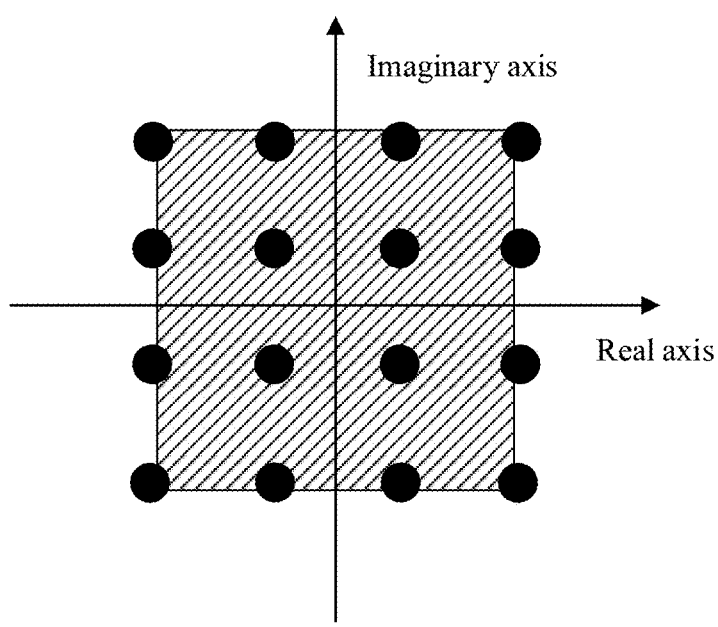
FIG. 6B is a schematic diagram of modulation constellation points of soft modulation of another type according to an embodiment of this application.

It may be understood that the examples, shown in FIG. 6A and FIG. 6B, of the modulation constellation points according to this embodiment of this application are also applicable to other modulation schemes, for example, BPSK, 64QAM, 256QAM, 512QAM 1024QAM, and π/2-BPSK.

It may be understood that soft modulation and hard modulation are merely names of two different types of modulation schemes in the embodiments of this application, and do not affect the protection scope of the embodiments of this application. Any modulation schemes that are essentially the same as those in the embodiments of this application but have different names shall fall within the protection scope of this application.

In part 410 in the embodiment of this application, the node quantizes the first modulation symbol obtained in part 400, to obtain the target symbol. The target symbol corresponds to one of the plurality of constellation points of the second modulation scheme. The second modulation scheme is BPSK, QPSK, 16QAM, 64QAM, 256QAM, 512QAM, or 1024QAM. This process may be understood as quantizing a soft modulation symbol obtained through soft modulation to a hard modulation symbol corresponding to hard modulation. Because the first modulation symbol and the target symbol correspond to constellation points (also referred to as modulation constellation points) on a complex plane, this process may be understood as quantizing a constellation point obtained through soft modulation to a constellation point corresponding to hard modulation.

Figure 7A:
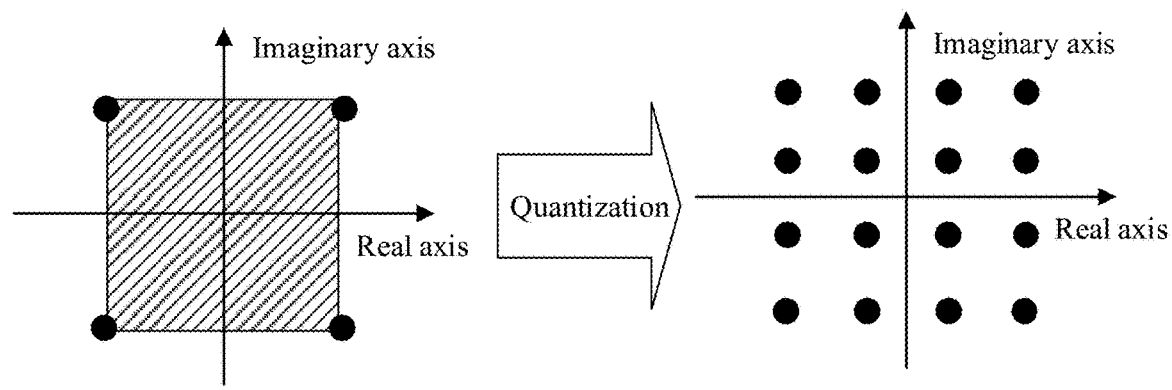
FIG. 7A is a first schematic diagram of soft modulation constellation points before and after quantization according to an embodiment of this application.
Figure 7B:
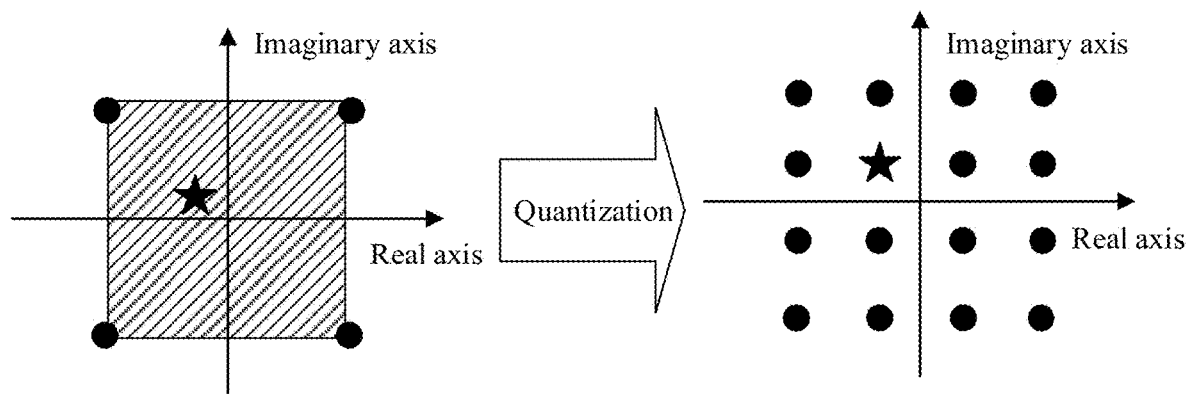
FIG. 7B is a second schematic diagram of soft modulation constellation points before and after quantization according to an embodiment of this application.

For example, a modulation order of the foregoing hard modulation is higher than a modulation order of the foregoing soft modulation. FIG. 7A is used as an example. A left side of FIG. 7A shows constellation points that may be obtained through QPSK soft modulation (for details, refer to descriptions of FIG. 6A). A right side of FIG. 7A shows constellation points that may be obtained through 16QAM hard modulation. A modulation order of 16QAM is higher than a modulation order of QPSK. The node may quantize one constellation point in a shaded area shown in the left side of FIG. 7A to one of 16 constellation points shown in the right side of FIG. 7A. Using a star-shaped constellation point in a shaded area shown in a left side of FIG. 7B as an example, the node may quantize the star-shaped constellation point to a star-shaped constellation point in 16 constellation points shown in a right side of FIG. 7B.

Figure 8A:
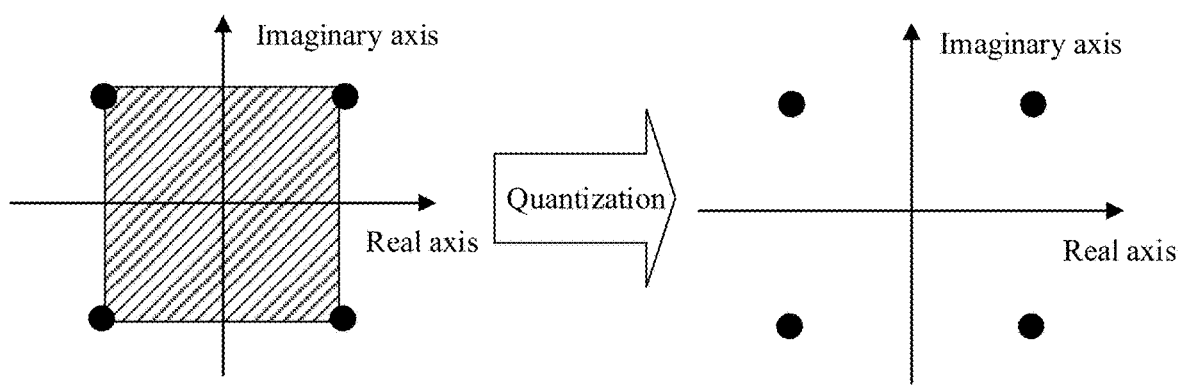
FIG. 8A is a third schematic diagram of soft modulation constellation points before and after quantization according to an embodiment of this application.
Figure 8B:
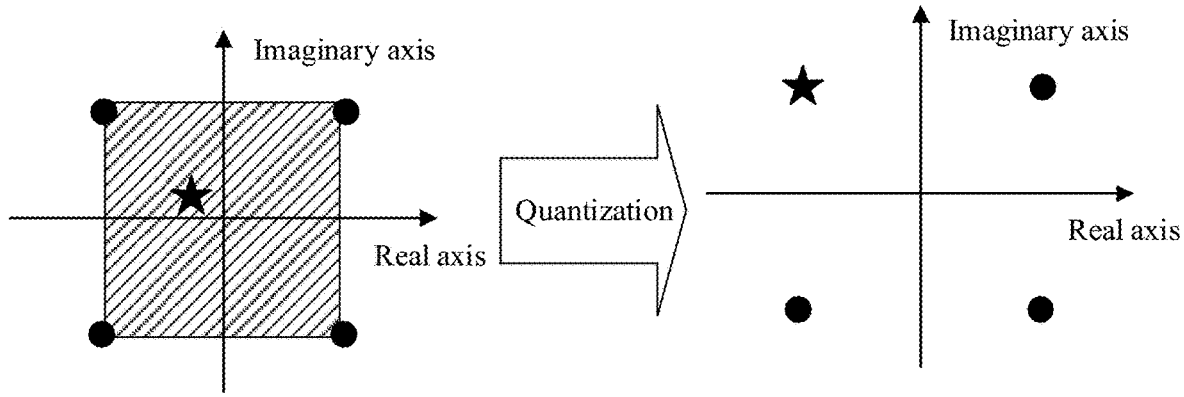
FIG. 8B is a fourth schematic diagram of soft modulation constellation points before and after quantization according to an embodiment of this application.

For example, a modulation order of the foregoing hard modulation is equal to a modulation order of the foregoing soft modulation. FIG. 8A is used as an example. A left side of FIG. 8A shows constellation points that may be obtained through QPSK soft modulation (for details, refer to descriptions of FIG. 6A). A right side of FIG. 8A shows constellation points that may be obtained through QPSK hard modulation. A modulation order of QPSK soft modulation is equal to a modulation order of QPSK hard modulation. The node may quantize one constellation point in a shaded area shown in the left side of FIG. 8A to one of four constellation points shown in the right side of FIG. 8A. Using a star-shaped constellation point in a shaded area shown in a left side of FIG. 8B as an example, the node may quantize the star-shaped constellation point to a star-shaped constellation point in four constellation points shown in a right side of FIG. 8B.

Figure 9A:
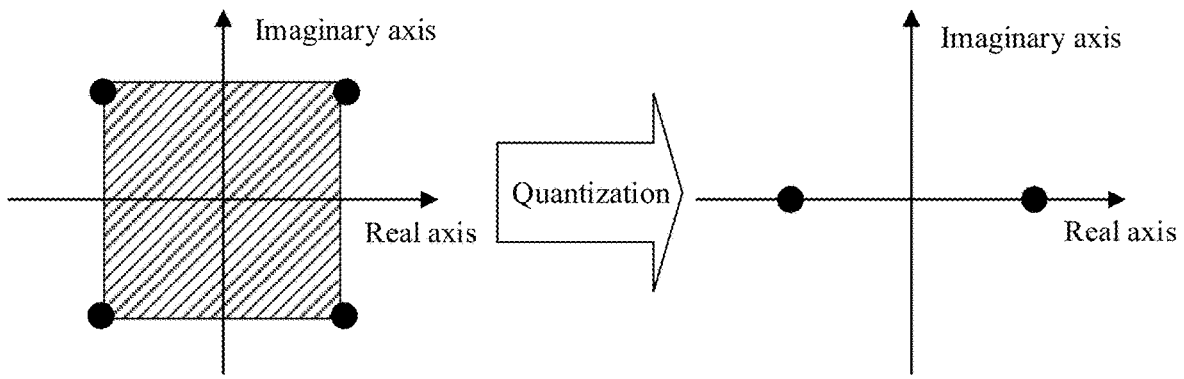
FIG. 9A is a fifth schematic diagram of soft modulation constellation points before and after quantization according to an embodiment of this application.
Figure 9B:
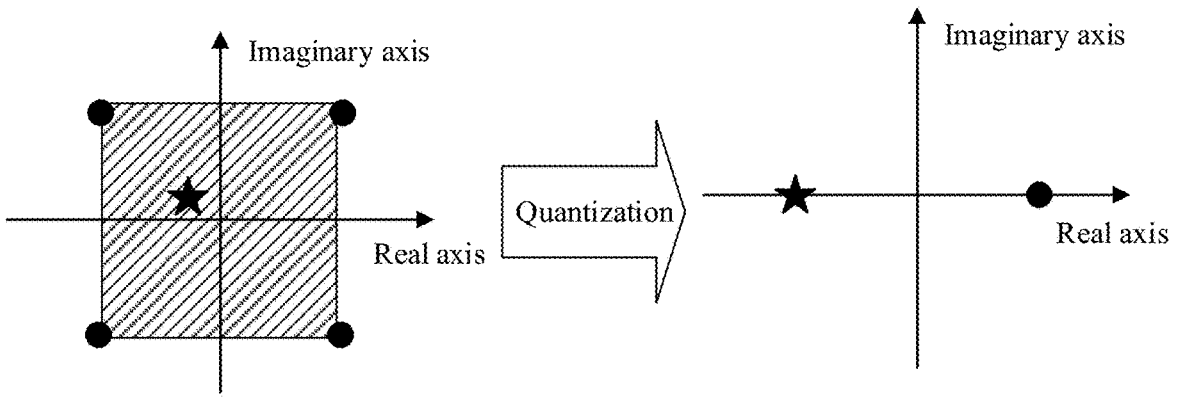
FIG. 9B is a sixth schematic diagram of soft modulation constellation points before and after quantization according to an embodiment of this application.

For example, a modulation order of the foregoing hard modulation is lower than a modulation order of the foregoing soft modulation. FIG. 9A is used as an example. A left side of FIG. 9A shows constellation points that may be obtained through QPSK soft modulation (for details, refer to descriptions of FIG. 6A). A right side of FIG. 9A shows constellation points that may be obtained through BPSK hard modulation. A modulation order of BPSK is lower than a modulation order of QPSK. The node may quantize one constellation point in a shaded area shown in the left side of FIG. 9A to one of two constellation points shown in the right side of FIG. 9A. Using a star-shaped constellation point in a shaded area shown in a left side of FIG. 9B as an example, the node may quantize the star-shaped constellation point to a star-shaped constellation point in two constellation points shown in a right side of FIG. 9B.

Figure 10:
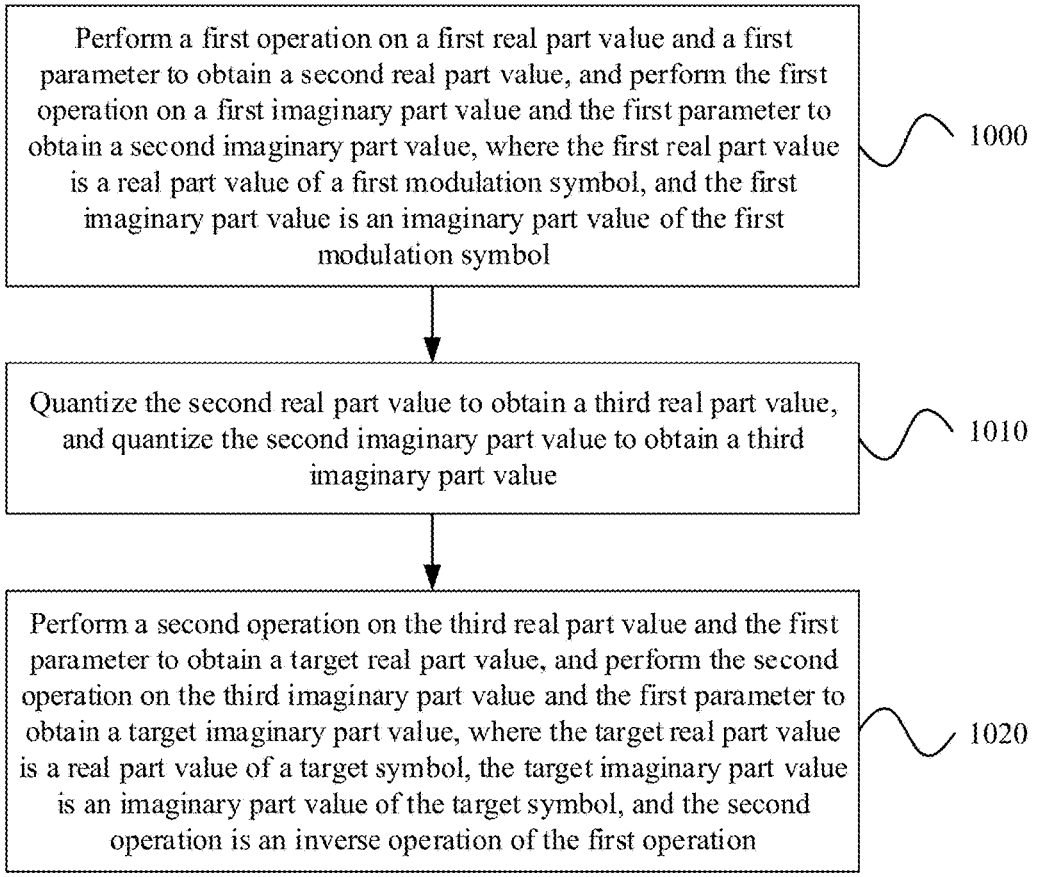
FIG. 10 is a schematic flowchart of quantization according to an embodiment of this application.

FIG. 10 schematically shows a possible implementation of the foregoing part 410, including the following parts:

Part 1000: Perform a first operation on a first real part value and a first parameter (the first parameter may be denoted by $\beta$) to obtain a second real part value, and perform the first operation on a first imaginary part value and the first parameter to obtain a second imaginary part value. The first real part value is a real part value of the first modulation symbol (which may also be referred to as the soft modulation symbol). The first imaginary part value is an imaginary part value of the first modulation symbol (which may also be referred to as the soft modulation symbol). Part 1000 may be understood as pre-quantization processing performed on the soft modulation symbol. The first operation is a multiplication operation, a division operation, an addition operation, or a subtraction operation.

Part 1010: Quantize the second real part value to obtain a third real part value, and quantize the second imaginary part value to obtain a third imaginary part value. Part 1010 may be understood as quantization processing performed on the soft modulation symbol.

Part 1020: Perform a second operation on the third real part value and the first parameter to obtain a target real part value, and perform the second operation on the third imaginary part value and the first parameter to obtain a target imaginary part value. The target real part value is a real part value of the target symbol (which may also be referred to as the hard modulation symbol). The target imaginary part value is an imaginary part value of the target symbol (which may also be referred to as the hard modulation symbol). The second operation is an inverse operation of the first operation (that is, if the first operation is a multiplication operation, the second operation is a division operation; if the first operation is a division operation, the second operation is a multiplication operation; if the first operation is an addition operation, the second operation is a subtraction operation; if the first operation is a subtraction operation, the second operation is an addition operation). Part 1020 may be understood as post-quantization processing performed on the soft modulation symbol.

According to the implementation shown in FIG. 10, the target symbol obtained through quantization can be kept in a same dimension as a symbol of the first modulation scheme (namely, the first modulation symbol).

The first parameter in FIG. 10 may be understood as an adjustment factor, and a function of the adjustment factor may be understood as adapting a value range of the soft modulation symbol to a value range of the hard modulation symbol. The first parameter $\beta$ may be determined based on the modulation scheme of the soft modulation symbol and the modulation scheme of the hard modulation symbol. For example, a value of the first parameter $\beta$ may be shown in Table 3. For example, the modulation scheme of the soft modulation symbol is QPSK (which may also be referred to as QPSK soft modulation), and the modulation scheme of the hard modulation symbol is 16QAM (which may also be referred to as 16QAM hard modulation). In this case, $\beta=3\sqrt{2}/\sqrt{10}$ is obtained from Table 3. For example, the modulation scheme of the soft modulation symbol is QPSK (which may also be referred to as QPSK soft modulation), and the modulation scheme of the hard modulation symbol is 64QAM (which may also be referred to as 64QAM hard modulation). In this case, $\beta=7\sqrt{2}/\sqrt{42}$ is obtained from Table 3. For example, the modulation scheme of the soft modulation symbol is QPSK (which may also be referred to as QPSK soft modulation), and the modulation scheme of the hard modulation symbol is QPSK (which may also be referred to as QPSK hard modulation). In this case, β=1 is obtained from Table 3.

TABLE 3

| Modulation scheme of the soft modulation symbol | Modulation scheme of the hard modulation symbol | | | | |
|---|---|---|---|---|---|
| | QPSK | 16 QAM | 64 QAM | 256 QAM | 1024 QAM |
| QPSK | 1 | $\frac{3\sqrt{2}}{\sqrt{10}}$ | $\frac{7\sqrt{2}}{\sqrt{42}}$ | $\frac{15\sqrt{2}}{\sqrt{170}}$ | $\frac{31\sqrt{2}}{\sqrt{682}}$ |
| 16 QAM | $\frac{\sqrt{10}}{3\sqrt{2}}$ | 1 | $\frac{7\sqrt{10}}{3\sqrt{42}}$ | $\frac{15\sqrt{10}}{3\sqrt{170}}$ | $\frac{31\sqrt{10}}{3\sqrt{682}}$ |
| 64 QAM | $\frac{\sqrt{42}}{7\sqrt{2}}$ | $\frac{3\sqrt{42}}{7\sqrt{10}}$ | 1 | $\frac{15\sqrt{42}}{7\sqrt{170}}$ | $\frac{31\sqrt{42}}{7\sqrt{682}}$ |
| 256 QAM | $\frac{\sqrt{170}}{15\sqrt{2}}$ | $\frac{3\sqrt{170}}{15\sqrt{10}}$ | $\frac{7\sqrt{170}}{15\sqrt{42}}$ | 1 | $\frac{31\sqrt{170}}{15\sqrt{682}}$ |
| 1024 QAM | $\frac{\sqrt{682}}{31\sqrt{2}}$ | $\frac{3\sqrt{682}}{31\sqrt{10}}$ | $\frac{7\sqrt{682}}{31\sqrt{42}}$ | $\frac{15\sqrt{682}}{31\sqrt{170}}$ | 1 |

It may be understood that Table 3 shows only an example of possible values of the first parameter, and the first parameter may alternatively have other values. For example, a value of the first parameter may alternatively be the reciprocal of that in Table 3. In addition, it may be understood that Table 3 shows only an example of a possible representation form of a relationship between the value of the first parameter, and the modulation scheme of the soft modulation symbol and the modulation scheme of the hard modulation symbol. Other representation forms also fall within the protection scope of the embodiments of this application.

In quantization processing in the foregoing part 1010, the third real part value may be determined based on a value range to which the second real part value belongs, and the third imaginary part value may be determined based on a value range to which the second imaginary part value belongs.

For example, the modulation scheme of the hard modulation symbol is 16QAM (which may also be referred to as 16QAM hard modulation). Table 4 shows an example of a possible correspondence between a value range of the second real part value and the third real part value and a possible correspondence between a value range of the second imaginary part value and the third imaginary part value. In some embodiments, a value range that is in a left column of Table 4 and within which the second real part value falls is determined based on the second real part value, and it is determined that a value, in a right column of Table 4, corresponding to the value range is the third real part value obtained by quantizing the second real part value. A value range that is in the left column of Table 4 and within which the second imaginary part value falls is determined based on the second imaginary part value, and it is determined that a value, in the right column of Table 4, corresponding to the value range is the third imaginary part value obtained by quantizing the second imaginary part value.

TABLE 4

| Value range of the second real part value/the second imaginary part value | Third real part value/Third imaginary part value |
|---|---|
| $\left[-\frac{3}{\sqrt{10}}, -\frac{2}{\sqrt{10}}\right)$ | $-\frac{3}{\sqrt{10}}$ |
| $\left[-\frac{2}{\sqrt{10}}, 0\right)$ | $-\frac{1}{\sqrt{10}}$ |
| $\left[0, \frac{2}{\sqrt{10}}\right)$ | $\frac{1}{\sqrt{10}}$ |
| $\left[\frac{2}{\sqrt{10}}, \frac{3}{\sqrt{10}}\right]$ | $\frac{3}{\sqrt{10}}$ |

For example, the modulation scheme of the hard modulation symbol is 64QAM (which may also be referred to as 64QAM hard modulation). Table 5 shows an example of a possible correspondence between a value range of the second real part value and the third real part value and a possible correspondence between a value range of the second imaginary part value and the third imaginary part value. In some embodiments, a value range that is in a left column of Table 5 and within which the second real part value falls is determined based on the second real part value, and it is determined that a value, in a right column of Table 5, corresponding to the value range is the third real part value obtained by quantizing the second real part value. A value range that is in the left column of Table 5 and within which the second imaginary part value falls is determined based on the second imaginary part value, and it is determined that a value, in the right column of Table 5, corresponding to the value range is the third imaginary part value obtained by quantizing the second imaginary part value.

TABLE 5

| Value range of the second real part value/second imaginary part value | Third real part value/Third imaginary part value |
|---|---|
| $\left[-\frac{7}{\sqrt{42}}, -\frac{6}{\sqrt{42}}\right)$ | $-\frac{7}{\sqrt{42}}$ |
| $\left[-\frac{6}{\sqrt{42}}, -\frac{4}{\sqrt{42}}\right)$ | $-\frac{5}{\sqrt{42}}$ |
| $\left[-\frac{4}{\sqrt{42}}, -\frac{2}{\sqrt{42}}\right)$ | $-\frac{3}{\sqrt{42}}$ |
| $\left[-\frac{2}{\sqrt{42}}, 0\right)$ | $-\frac{1}{\sqrt{42}}$ |
| $\left[0, \frac{2}{\sqrt{42}}\right)$ | $\frac{1}{\sqrt{42}}$ |
| $\left[\frac{2}{\sqrt{42}}, \frac{4}{\sqrt{42}}\right)$ | $\frac{3}{\sqrt{42}}$ |
| $\left[\frac{4}{\sqrt{42}}, \frac{6}{\sqrt{42}}\right)$ | $\frac{5}{\sqrt{42}}$ |
| $\left[\frac{6}{\sqrt{42}}, \frac{7}{\sqrt{42}}\right]$ | $\frac{7}{\sqrt{42}}$ |

It may be understood that the value ranges of the second real part value/the second imaginary part value shown in Table 4 and Table 5 are merely examples. The embodiments of this application are not limited to division into the foregoing value ranges. Table 4 and Table 5 show possible quantization relationships by using only examples in which the second modulation scheme is 16QAM and 64QAM. Quantization relationships in other second modulation schemes also fall within the protection scope of the embodiments of this application. In addition, it may be understood that values in the first column and the second column in Table 4 or Table 5 may be multiplied by a same real number (the real number may be considered as a scalar factor).

In FIG. 10, an example in which the first modulation symbol is denoted by $\tilde{Q}_{R\_Mod1}+j\tilde{Q}_{I\_Mod1}$ and the value of the first parameter β is the value in Table 3 is used, where $\tilde{Q}_{R\_Mod1}$ is the first real part value, and $\tilde{Q}_{I\_Mod1}$ is the first imaginary part value. The first operation is a multiplication operation, and the second operation is a division operation (that is, an inverse operation of the multiplication operation).

In part 1000 in FIG. 10, the multiplication operation is performed on the first real part value $\tilde{Q}_{R\_Mod1}$ and the first parameter β to obtain the second real part value $β\tilde{Q}_{R\_Mod1}$, and the multiplication operation is performed on the first imaginary part value $\tilde{Q}_{I\_Mod1}$ and the first parameter β to obtain the second imaginary part value $β\tilde{Q}_{I\_Mod1}$.

In part 1010 in FIG. 10, the second real part value $β\tilde{Q}_{R\_Mod1}$ is quantized to obtain the third real part value $Q_{R\_Mod2}$, and the second imaginary part value $β\tilde{Q}_{I\_Mod1}$ is quantized to obtain the third imaginary part value $Q_{I\_Mod2}$. For example, according to the example in Table 4 or Table 5, the third real part value $Q_{R\_Mod2}$ may be obtained based on the second real part value $β\tilde{Q}_{R\_Mod1}$, and the third imaginary part value $Q_{I\_Mod2}$ may be obtained based on the second imaginary part value $β\tilde{Q}_{I\_Mod1}$.

In part 1020 in FIG. 10, the division operation is performed on the third real part value $Q_{R\_Mod2}$ and the first parameter β to obtain the target real part value $Q_{R\_Mod2}/β$, and the division operation is performed on the third imaginary part value $Q_{I\_Mod2}$ and the first parameter β to obtain the target imaginary part value $Q_{I\_Mod2}/β$. The obtained target symbol is denoted by $Q_{R\_Mod2}/β+jQ_{I\_Mod2}/β$.

It may be understood that the value of the first parameter β may alternatively be the reciprocal of that in Table 3. In this case, the first operation in the example in FIG. 10 is a division operation, and the second operation in the example is a multiplication operation. When β=1, the first real part value is equal to the second real part value, and the first imaginary part value is equal to the second imaginary part value. This may also be understood as follows: Part 1000 is not performed, that is, the first real part value is used as the second real part value, and the first imaginary part value is used as the second imaginary part value; and execution starts from part 1010.

Figure 11:
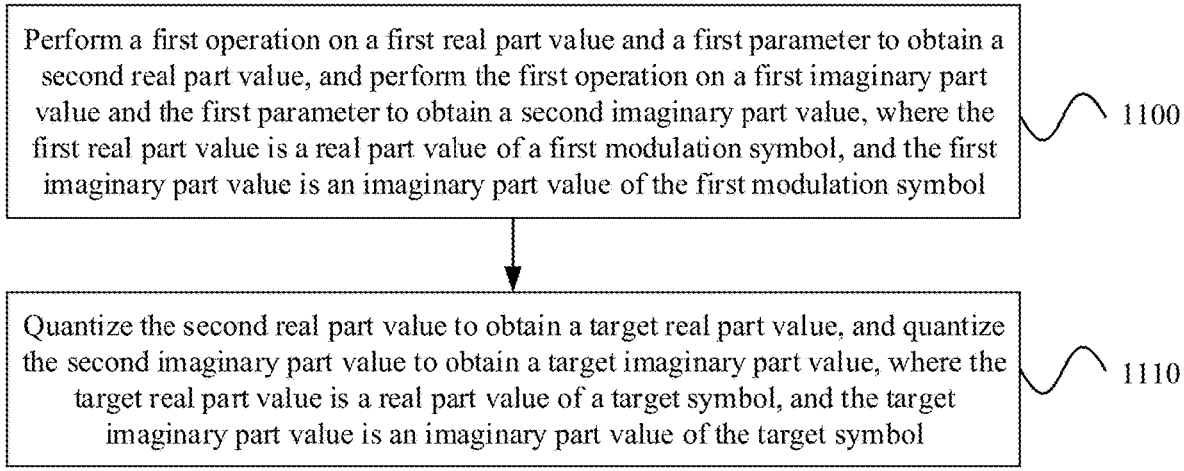
FIG. 11 is another schematic flowchart of quantization according to an embodiment of this application.

FIG. 11 schematically shows another possible implementation of the foregoing part 410, including the following parts:

Part 1100: Perform a first operation on a first real part value and a first parameter (the first parameter may be denoted by β) to obtain a second real part value, and perform the first operation on a first imaginary part value and the first parameter to obtain a second imaginary part value. The first real part value is a real part value of the first modulation symbol (which may also be referred to as the soft modulation symbol). The first imaginary part value is an imaginary part value of the first modulation symbol (which may also be referred to as the soft modulation symbol). Part 1100 may be understood as pre-quantization processing performed on the soft modulation symbol. The first operation is a multiplication operation, a division operation, an addition operation, or a subtraction operation.

Part 1110: Quantize the second real part value to obtain a target real part value, and quantize the second imaginary part value to obtain a target imaginary part value. The target real part value is a real part value of the target symbol (which may also be referred to as the hard modulation symbol). The target imaginary part value is an imaginary part value of the target symbol (which may also be referred to as the hard modulation symbol). Part 1110 may be understood as quantization processing performed on the soft modulation symbol.

According to the implementation shown in FIG. 11, the target symbol obtained through quantization can be kept in a same dimension as that in the second modulation scheme.

For the first parameter in FIG. 11, refer to descriptions of the first parameter in FIG. 10. For quantization in part 1110 in FIG. 11, refer to descriptions of quantization in part 1010 in FIG. 10. Details are not described herein again.

In FIG. 11, an example in which the first modulation symbol is denoted by $\tilde{Q}_{R\_Mod1}+j\tilde{Q}_{I\_Mod1}$ and a value of the first parameter β is the value in Table 3 is used, where $\tilde{Q}_{R\_Mod1}$ is the first real part value, and $\tilde{Q}_{I\_Mod1}$ is the first imaginary part value. The first operation is a multiplication operation.

In part 1100 in FIG. 11, the multiplication operation is performed on the first real part value $\tilde{Q}_{R\_Mod1}$ and the first parameter β to obtain the second real part value $β\tilde{Q}_{R\_Mod1}$, and the multiplication operation is performed on the first imaginary part value $\tilde{Q}_{I\_Mod1}$ and the first parameter β to obtain the second imaginary part value $β\tilde{Q}_{I\_Mod1}$.

In part 1110 in FIG. 11, the second real part value $β\tilde{Q}_{R\_Mod1}$ is quantized to obtain the target real part value $Q_{R\_Mod2}$, and the second imaginary part value $β\tilde{Q}_{I\_Mod1}$ is quantized to obtain the target imaginary part value $Q_{I\_Mod2}$. For example, according to the example in Table 4 or Table 5, the target real part value $Q_{R\_Mod2}$ may be obtained based on the second real part value $β\tilde{Q}_{R\_Mod1}$, and the target imaginary part value $Q_{I\_Mod2}$ may be obtained based on the second imaginary part value $β\tilde{Q}_{I\_Mod1}$. The obtained target symbol is denoted by $Q_{R\_Mod2}+jQ_{I\_Mod2}$.

It may be understood that a value of the first parameter β may alternatively be the reciprocal of that in Table 3. In this case, the first operation in the example in FIG. 11 is a division operation. When β=1, the first real part value is equal to the second real part value, and the first imaginary part value is equal to the second imaginary part value. This may also be understood as follows: Part 1100 is not performed, that is, the first real part value is used as the second real part value, and the first imaginary part value is used as the second imaginary part value; and execution starts from part 1110.

Figure 12:
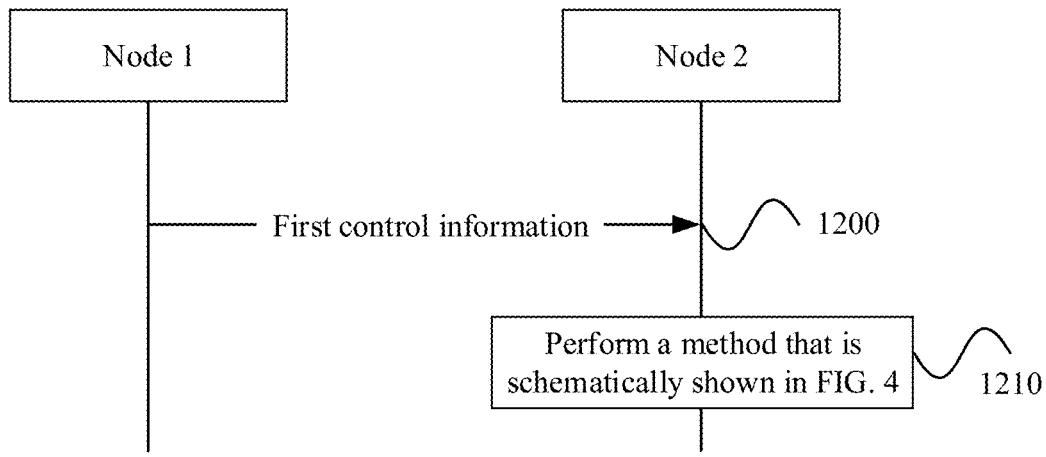
FIG. 12 is a schematic diagram of interaction between nodes according to an embodiment of this application.

In some embodiments, the node may control enabling or disabling of the soft modulation symbol quantization operation that is schematically shown in FIG. 4. FIG. 12 is a schematic diagram of enabling soft modulation symbol quantization according to an embodiment of this application, including the following parts:

Part 1200: A node 2 receives first control information, where the first control information is sent by a node 1. The first control information includes first indication information and/or identification information of the node 2. The identification information of the node 2 indicates the node 2, and the first indication information indicates the node 2 to perform the method that is schematically shown in FIG. 4.

Part 1210: The node 2 performs the method that is schematically shown in FIG. 4. For detailed descriptions, refer to the foregoing descriptions of FIG. 4. Details are not described herein again.

The "performing the method that is schematically shown in FIG. 4" may be understood as performing part 400 and part 410 in FIG. 4, or may be understood as performing part 400, part 410, part 420, and part 430 in FIG. 4. The node 2 may be understood as the node in FIG. 4.

According to the method schematically shown in FIG. 12, the data sending method or soft modulation symbol quantization method schematically shown in FIG. 4 may be enabled based on a data sending requirement, and the node can be notified to use a suitable modulation scheme. This improves robustness of data sending.

In the foregoing part 1200, the node 2 receives the first control information, and determines, based on the first control information, to quantize the first modulation symbol in FIG. 4/FIG. 5 to obtain the target symbol in FIG. 4/FIG. 5.

For example, the first indication information included in the first control information indicates the node 2 to quantize the first modulation symbol to obtain the target symbol.

Alternatively, the first indication information included in the first control information indicates the second modulation scheme in FIG. 4, so that the node 2 quantizes the first modulation symbol based on the second modulation scheme to obtain the target symbol.

Alternatively, the first indication information included in the first control information indicates the second modulation scheme in FIG. 4, and indicates the node 2 to quantize the first modulation symbol to obtain the target symbol.

In some embodiments, the first indication information indicates the foregoing first parameter, and the node 2 can perform correct data modulation based on the first parameter.

The first control information in FIG. 12 may be included in physical layer information and/or higher layer information. For example, the first control information may be included in the physical layer information, and the physical layer information may be, for example, downlink control information (downlink control information, DCI) from a network device, or may be, for another example, sidelink control information (sidelink control information, SCI) or uplink control information (uplink control information, UCI) from a terminal. The DCI is information sent by the network device and received by the terminal. The SCI is information sent by the terminal and received by another terminal. The UCI is information sent by the terminal and received by the network device. For another example, the first control information may be included in the higher layer information, and the higher layer information may be, for example, included in a media access control (media access control, MAC) layer message or a radio resource control (radio resource control, RRC) layer message from a network device or a terminal.

In a possible implementation in which the first control information is included in the physical layer information, one or more bits in a modulation and coding scheme (modulation coding scheme, MCS) indication field in the DCI or SCI may be reused to carry the first indication information in the first control information.

In a possible implementation in which the first indication information indicates the second modulation scheme in FIG. 4, the first indication information indicates an identifier or index of the second modulation scheme.

In another possible implementation in which the first indication information indicates the second modulation scheme in FIG. 4, the first indication information indicates an offset of the second modulation scheme relative to the first modulation scheme. For example, a correspondence between an index/identifier and the offset may be predefined, and the first indication information indicates the offset by indicating the index/identifier.

The offset may be an offset between a modulation order of the second modulation scheme and a modulation order of the first modulation scheme. For example, if the second modulation scheme is 16QAM (the modulation order is 4), and the first modulation scheme is QPSK (the modulation order is 2), the offset is 2 or −2. For another example, if the second modulation scheme is 16QAM (the modulation order is 4), and the first modulation scheme is 16QAM (the modulation order is 4), the offset is 0.

Alternatively, the offset may be an offset between the second modulation scheme and the first modulation scheme when a plurality of modulation schemes are arranged in a specific order. An arrangement order of three modulation schemes {QPSK, 16QAM, 64QAM} is used as an example. For example, if the second modulation scheme is 16QAM, and the first modulation scheme is QPSK, the offset is 1 or −1. For another example, if the second modulation scheme is 64QAM, and the first modulation scheme is QPSK, the offset is 2 or −2. For still another example, if the second modulation scheme is 16QAM, and the first modulation scheme is 16QAM, the offset is 0.

Figure 13:
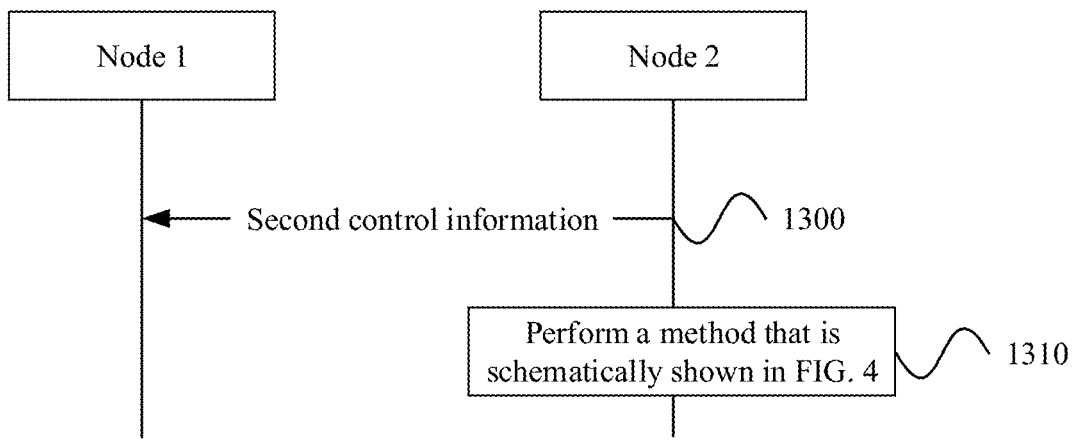
FIG. 13 is another schematic diagram of interaction between nodes according to an embodiment of this application.

In some embodiments, the node may notify another node of information related to soft modulation symbol quantization. FIG. 13 is a schematic diagram of notifying information related to soft modulation symbol quantization according to an embodiment of this application, including the following parts:

Part 1300: A node 2 sends second control information, where the second control information may be received by a node 1. The second control information includes second indication information and/or identification information of the node 1. The identification information of the node 1 indicates the node 1, and the node 1 receives, based on the second indication information, data sent by the node 2.

Part 1310: The node 2 performs the method that is schematically shown in FIG. 4. For detailed descriptions, refer to the foregoing descriptions of FIG. 4. Details are not described herein again.

The "performing the method that is schematically shown in FIG. 4" may be understood as performing part 400 and part 410 in FIG. 4, or may be understood as performing part 400, part 410, part 420, and part 430 in FIG. 4. The node 2 may be understood as the node in FIG. 4.

It may be understood that a specific execution order of part 1300 and part 1310 is not limited in FIG. 13. For example, part 1300 may be performed before part 1310. For another example, part 1310 may be performed before part 1300. For still another example, part 1300 and part 1310 may be simultaneously performed.

According to the method schematically shown in FIG. 13, the data receiving node can be notified to use a suitable data receiving method, thereby improving robustness of data receiving.

In a possible implementation of the foregoing part 1300, the second indication information indicates the first modulation scheme in FIG. 4, and the node 1 demodulates, based on the first modulation scheme, the data sent by the node 2. In some embodiments, the second indication information indicates the second modulation scheme in FIG. 4, and the node 1 demodulates, based on the second modulation scheme, the data sent by the node 2. In addition, the node 1 may further obtain the foregoing first parameter by using the first modulation scheme and the second modulation scheme, so as to perform correct data demodulation based on the first parameter when the data is received. In some embodiments, the second indication information indicates the foregoing first parameter, and the node 1 can perform correct data demodulation based on the first parameter when the data is received.

For a specific implementation method of the second control information in FIG. 13, refer to the foregoing descriptions of the first control information. Details are not described herein again.

Figure 14:
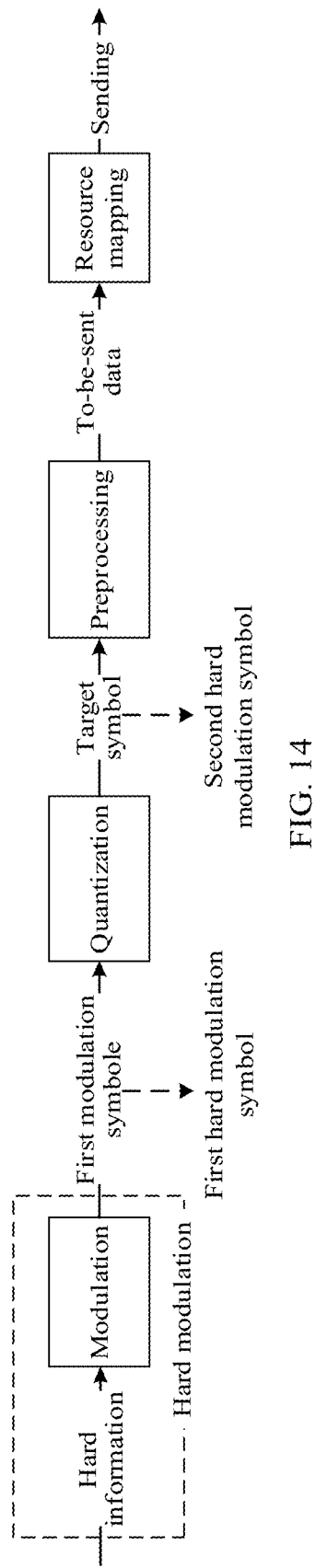
FIG. 14 is a schematic block diagram of quantizing a hard modulation symbol according to an embodiment of this application.

The embodiment of this application schematically shown in FIG. 4 may be understood as a method for quantizing a first hard modulation symbol generated according to a hard modulation scheme to a second hard modulation symbol corresponding to another hard modulation scheme, and sending the second hard modulation symbol. FIG. 14 is a schematic block diagram of quantizing a first hard modulation symbol generated through hard modulation to a second hard modulation symbol, and sending the second hard modulation symbol obtained through quantization according to an embodiment of this application. In FIG. 14, a hard modulation process is as follows: Hard information (the hard information is hard bit information of 0 or 1, or hard symbol information of −1 or 1) is input for modulation, and a first modulation symbol is output after hard modulation. The first modulation symbol may be referred to as the first hard modulation symbol. After the first modulation symbol is obtained through hard modulation, the first modulation symbol is quantized to obtain a target symbol. The target symbol may be referred to as the second hard modulation symbol. After the target symbol is obtained, the target symbol is preprocessed (a preprocessing process includes one or more of layer mapping, antenna port mapping, precoding, or transform precoding) to obtain to-be-sent data. The to-be-sent data is mapped to a physical resource (that is, resource mapping is performed), and the to-be-sent data is sent by using the physical resource.

According to the method provided in this embodiment of this application, a soft modulation symbol generated through soft modulation may be quantized to a limited quantity of constellation points before being sent, so as to obtain a comparatively low PAPR and/or a comparatively low EVM. In this way, it can be ensured that requirements of an intermediate frequency indicator and a radio frequency indicator are both met.

Figure 15:
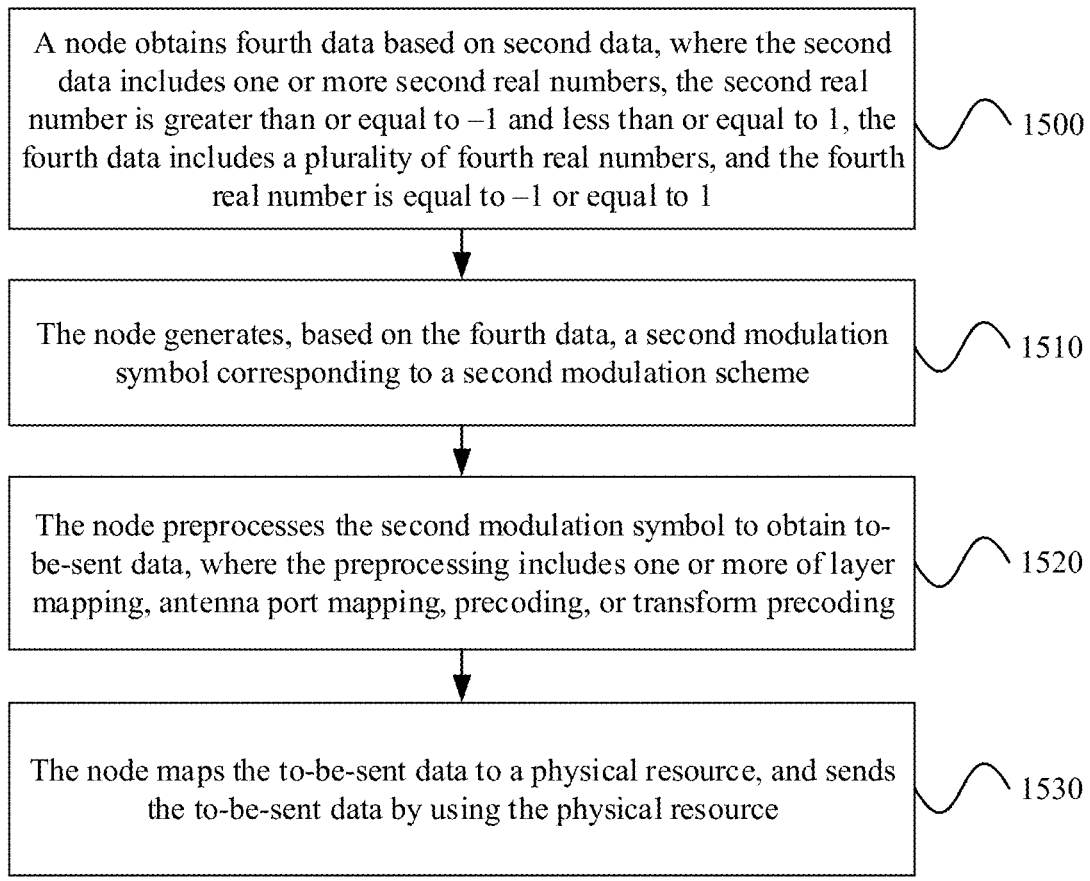
FIG. 15 is a schematic flowchart of another data sending method according to an embodiment of this application.

FIG. 15 is a schematic flowchart of another data sending method according to an embodiment of this application. It may be understood that sent data in the data sending method in this embodiment of this application may be data that includes control information, may be data that includes service information, or may be data that not only includes control information but also includes service information. As shown in FIG. 15, the method in this embodiment may include the following parts:

Part 1500: A node obtains fourth data based on second data. The second data includes one or more second real numbers. The second real number is greater than or equal to −1 and less than or equal to 1. The fourth data includes a plurality of fourth real numbers. The fourth real number is equal to −1 or equal to 1. It may be understood that the node in this embodiment of this application may be a terminal, or may be a network device.

Part 1510: The node generates, based on the fourth data, a second modulation symbol corresponding to a second modulation scheme. The second modulation scheme is BPSK, QPSK, 16QAM, 64QAM, 256QAM, 512QAM, or 1024QAM.

Part 1520: The node preprocesses the second modulation symbol to obtain to-be-sent data. The preprocessing includes one or more of layer mapping, antenna port mapping, precoding, or transform precoding. The preprocessing may be understood as a processing operation that needs to be completed before the target symbol is mapped to a physical resource.

Part 1530: The node maps the to-be-sent data to the physical resource, and sends the to-be-sent data by using the physical resource. The physical resource may include one or more of a time domain resource, a frequency domain resource, a code domain resource, or a space domain resource. For example, the time domain resource included in the physical resource may include at least one frame, at least one sub-frame (sub-frame), at least one slot (slot), at least one mini-slot (mini-slot), or at least one time domain symbol. For example, the frequency domain resource included in the physical resource may include at least one carrier (carrier), at least one component carrier (component carrier, CC), at least one bandwidth part (bandwidth part, BWP), at least one resource block group (resource block group, RBG), at least one physical resource block group (physical resource-block group, PRG), at least one resource block (resource block, RB), or at least one sub-carrier (sub-carrier, SC). For example, the space domain resource included in the physical resource may include at least one beam, at least one port, at least one antenna port, or at least one layer/spatial layer. For example, the code domain resource included in the physical resource may include at least one orthogonal cover code (orthogonal cover code, OCC) or at least one non-orthogonal multiple access (non-orthogonal multiple access, NOMA) code.

It may be understood that the physical resource may be a physical resource of a baseband, and the physical resource of the baseband may be used by a baseband chip; or the physical resource may be a physical resource of an air interface; or the physical resource may be a physical resource of intermediate frequency or radio frequency.

Figure 16:
FIG. 16 is a schematic block diagram of quantizing soft information according to an embodiment of this application.

The embodiment of this application schematically shown in FIG. 15 may be understood as a method for mapping soft information to to-be-modulated information, modulating the to-be-modulated information to obtain a hard modulation symbol, and sending the hard modulation symbol. FIG. 16 is a schematic block diagram according to an embodiment of this application. In FIG. 16, soft information mapping is performed on soft information to obtain to-be-modulated information. The soft information may be understood as the second data in FIG. 15, and the to-be-modulated information may be understood as the fourth data in FIG. 15. After the to-be-modulated information is obtained, modulation (hard modulation) is performed on the to-be-modulated information to obtain a second modulation symbol. The second modulation symbol may be referred to as a hard modulation symbol. After the second modulation symbol is obtained, the second modulation symbol is preprocessed (a preprocessing process includes one or more of layer mapping, antenna port mapping, precoding, or transform precoding) to obtain to-be-sent data. The to-be-sent data is mapped to a physical resource (that is, resource mapping is performed), and the to-be-sent data is sent by using the physical resource.

According to the method provided in this embodiment of this application, the soft information may be modulated to a limited quantity of constellation points before being sent, so as to obtain a comparatively low PAPR and/or a comparatively low EVM. In this way, it can be ensured that requirements of an intermediate frequency indicator and a radio frequency indicator are both met, so that a modulation signal of the soft information can be sent by using an intermediate frequency device/a radio frequency device.

In a possible implementation of the foregoing part 1500 and part 1510, the second data (which may also be understood as the soft information) includes two second real numbers $\tilde{a}_0$ and $\tilde{a}_1$, and the fourth data includes four fourth real numbers $a_0$, $a_1$, $a_2$, and $a_3$. Through soft information mapping schematically shown in FIG. 16, $a_0$ and $a_2$ are obtained based on $\tilde{a}_0$, $a_1$ and $a_3$ are obtained based on $\tilde{a}_1$, and 16QAM (that is, the second modulation scheme) modulation is performed on $a_0$, $a_1$, $a_2$, and $a_3$ to obtain the second modulation symbol Q, that is, $Q=1/\sqrt{10}\times\{(2a_0-a_0a_2)+j(2a_1-a_1a_3)\}$ is met.

Table 6 and Table 7 are used as examples. Table 6 shows an example of a possible mapping relationship (which may also be referred to as a correspondence) between $\tilde{a}_0$, and $a_0$ and $a_2$. Table 7 shows an example of a possible mapping relationship between $\tilde{a}_1$, and $a_1$ and $a_3$. The node obtains $\tilde{a}_0$; determines, from the first column of Table 6, a value interval within which a value of $\tilde{a}_0$ falls; and determines that values that are in the second and the third columns of Table 6 and that correspond to the value interval are values of $a_0$ and $a_2$ obtained by mapping $\tilde{a}_0$. The node obtains $\tilde{a}_1$; determines, from the first column of Table 7, a value interval within which a value of $\tilde{a}_1$ falls; and determines that values that are in the second and the third columns of Table 7 and that correspond to the value interval are values of $a_1$ and $a_3$ obtained by mapping $\tilde{a}_1$.

TABLE 6

| Value range of $\tilde{a}_0$ | Value of $a_0$ | Value of $a_2$ |
| --- | --- | --- |
| $[-1, -\frac{2}{3})$ | −1 | −1 |
| $[-\frac{2}{3}, 0)$ | −1 | 1 |
| $[0, \frac{2}{3})$ | 1 | 1 |
| $[\frac{2}{3}, 1]$ | 1 | −1 |

TABLE 7

| Value range of $\tilde{a}_1$ | Value of $a_1$ | Value of $a_3$ |
| --- | --- | --- |
| $[-1, -\frac{2}{3})$ | −1 | −1 |
| $[-\frac{2}{3}, 0)$ | −1 | 1 |
| $[0, \frac{2}{3})$ | 1 | 1 |
| $[\frac{2}{3}, 1]$ | 1 | −1 |

In another possible implementation of the foregoing part 1500 and part 1510, the second data (which may also be understood as the soft information) includes four second real numbers $\tilde{a}_0$, $\tilde{a}_1$, $\tilde{a}_2$, and $\tilde{a}_3$, and the fourth data includes six fourth real numbers $a_0$, $a_1$, $a_2$, $a_3$, $a_4$, and $a_5$. Through soft information mapping schematically shown in FIG. 16, $a_0$ is obtained based on $\tilde{a}_0$, $a_2$ and $a_4$ are obtained based on $\tilde{a}_2$, $a_1$ is obtained based on $\tilde{a}_1$, $a_3$ and $a_5$ are obtained based on $\tilde{a}_3$, and 64QAM (that is, the second modulation scheme) modulation is performed on $a_0$, $a_1$, $a_2$, $a_3$, $a_4$, and $a_5$ to obtain the second modulation symbol Q, that is, $Q=1/\sqrt{42}\times\{(4a_0-2a_0a_2+a_0a_2a_4)+j(4a_1-2a_1a_3+a_1a_3a_5)\}$ is met.

Table 8, Table 9, Table 10, and Table 11 are used as examples. Table 8 shows an example of a possible mapping relationship (which may also be referred to as a correspondence) between $\tilde{a}_0$ and $a_0$. Table 9 shows an example of a possible mapping relationship between $\tilde{a}_1$ and $a_1$. Table 10 shows an example of a possible mapping relationship between $\tilde{a}_2$, and $a_2$ and $a_4$. Table 11 shows an example of a possible mapping relationship between $\tilde{a}_3$, and $a_3$ and $a_5$. For descriptions of obtaining, by the node, values of $a_0$, $a_1$, $a_2$, $a_3$, $a_4$, and $a_5$ based on value ranges of $\tilde{a}_0$, $\tilde{a}_1$, $\tilde{a}_2$, and $\tilde{a}_3$, refer to the foregoing descriptions of Table 6 or Table 7. Details are not described herein again.

TABLE 8

| Value range of $\tilde{a}_0$ | Value of $a_0$ |
| --- | --- |
| $[-1, 0)$ | −1 |
| $[0, 1]$ | 1 |

TABLE 9

| Value range of $\tilde{a}_1$ | Value of $a_1$ |
| --- | --- |
| $[-1, 0)$ | −1 |
| $[0, 1]$ | 1 |

TABLE 10

| Value range of $\tilde{a}_2$ | Value of $a_2$ | Value of $a_4$ |
| --- | --- | --- |
| $[-1, -\frac{2}{3})$ | −1 | −1 |
| $[-\frac{2}{3}, 0)$ | −1 | 1 |
| $[0, \frac{2}{3})$ | 1 | 1 |
| $[\frac{2}{3}, 1]$ | 1 | −1 |

TABLE 11

| Value range of $\tilde{a}_3$ | Value of $a_3$ | Value of $a_5$ |
| --- | --- | --- |
| $[-1, -\frac{2}{3})$ | −1 | −1 |
| $[-\frac{2}{3}, 0)$ | −1 | 1 |
| $[0, \frac{2}{3})$ | 1 | 1 |
| $[\frac{2}{3}, 1]$ | 1 | −1 |

In another possible implementation of the foregoing part 1500 and part 1510, the second data (which may also be understood as the soft information) includes two second real numbers $\tilde{a}_0$ and $\tilde{a}_1$, and the fourth data includes six fourth real numbers $a_0$, $a_1$, $a_2$, $a_3$, $a_4$, and $a_5$. Through soft information mapping schematically shown in FIG. 16, $a_0$, $a_2$, and $a_4$ are obtained based on $\tilde{a}_0$, $a_1$, $a_3$, and $a_5$ are obtained based on $\tilde{a}_1$, and 64QAM (that is, the second modulation scheme) modulation is performed on $a_0$, $a_1$, $a_2$, $a_3$, $a_4$, and $a_5$ to obtain the second modulation symbol Q, that is, $Q=1/\sqrt{42}\times\{(4a_0-2a_0a_2+a_0a_2a_4)+j(4a_1-2a_1a_3+a_1a_3a_5)\}$ is met.

Table 12 and Table 13 are used as examples. Table 12 shows an example of a possible mapping relationship (which may also be referred to as a correspondence) between $\tilde{a}_0$, and $a_0$, $a_2$, and $a_4$. Table 13 shows an example of a possible mapping relationship between $\tilde{a}_1$, and $a_1$, $a_3$, and $a_5$. For descriptions of obtaining, by the node, values of $a_0$, $a_1$, $a_2$, $a_3$, $a_4$, and $a_5$ based on value ranges of $\tilde{a}_0$ and $\tilde{a}_1$, refer to the foregoing descriptions of Table 6 or Table 7. Details are not described herein again.

TABLE 12

| Value range of $\tilde{a}_0$ | Value of $a_0$ | Value of $a_2$ | Value of $a_4$ |
| --- | --- | --- | --- |
| $\left[-1, -\frac{6}{7}\right)$ | $-1$ | $-1$ | $-1$ |
| $\left[-\frac{6}{7}, -\frac{4}{7}\right)$ | $-1$ | $-1$ | $1$ |
| $\left[-\frac{4}{7}, -\frac{2}{7}\right)$ | $-1$ | $1$ | $1$ |
| $\left[-\frac{2}{7}, 0\right)$ | $-1$ | $1$ | $-1$ |
| $\left[0, \frac{2}{7}\right)$ | $1$ | $1$ | $-1$ |
| $\left[\frac{2}{7}, \frac{4}{7}\right)$ | $1$ | $1$ | $1$ |
| $\left[\frac{4}{7}, \frac{6}{7}\right)$ | $1$ | $-1$ | $1$ |
| $\left[\frac{6}{7}, 1\right]$ | $1$ | $-1$ | $-1$ |

TABLE 13

| Value range of $\tilde{a}_1$ | Value of $a_1$ | Value of $a_3$ | Value of $a_5$ |
| --- | --- | --- | --- |
| $\left[-1, -\frac{6}{7}\right)$ | $-1$ | $-1$ | $-1$ |
| $\left[-\frac{6}{7}, -\frac{4}{7}\right)$ | $-1$ | $-1$ | $1$ |
| $\left[-\frac{4}{7}, -\frac{2}{7}\right)$ | $-1$ | $1$ | $1$ |
| $\left[-\frac{2}{7}, 0\right)$ | $-1$ | $1$ | $-1$ |
| $\left[0, \frac{2}{7}\right)$ | $1$ | $1$ | $-1$ |
| $\left[\frac{2}{7}, \frac{4}{7}\right)$ | $1$ | $1$ | $1$ |
| $\left[\frac{4}{7}, \frac{6}{7}\right)$ | $1$ | $-1$ | $1$ |
| $\left[\frac{6}{7}, 1\right]$ | $1$ | $-1$ | $-1$ |

The foregoing part 1500 and part 1510 may be alternatively replaced by the following part 1500-1 and part 1510-1:

Part 1500-1: A node obtains fifth data based on second data. The second data includes one or more second real numbers. The second real number is greater than or equal to $-1$ and less than or equal to 1. The fifth data includes a plurality of fifth real numbers. The fifth real number is equal to 0 or equal to 1.

Part 1510-1: The node generates, based on the fifth data, a second modulation symbol corresponding to a second modulation scheme.

In a possible implementation of the foregoing part 1500-1 and part 1510-1, the second data (which may also be understood as the soft information) includes two second real numbers $\tilde{a}_0$ and $\tilde{a}_1$, and the fifth data includes four fifth real numbers $b_0$, $b_1$, $b_2$, and $b_3$. Through soft information mapping schematically shown in FIG. 16, $b_0$ and $b_2$ are obtained based on $\tilde{a}_0$, $b_1$ and $b_3$ are obtained based on $\tilde{a}_1$, and 16QAM (that is, the second modulation scheme) modulation is performed on $b_0$, $b_1$, $b_2$, and $b_3$ to obtain the second modulation symbol Q, that is, $Q=1/\sqrt{10}\times\{(1-2b_0)[2-(1-2b_2)]+j(1-2b_1)[2-(1-2b_3)]\}$ is met.

Table 14 and Table 15 are used as examples. Table 14 shows an example of a possible mapping relationship (which may also be referred to as a correspondence) between $\tilde{a}_0$, and $b_0$ and $b_2$. Table 15 shows an example of a possible mapping relationship between $\tilde{a}_1$, and $b_1$ and $b_3$. For descriptions of obtaining, by the node, values of $b_0$, $b_1$, $b_2$, and $b_3$ based on value ranges of $\tilde{a}_0$ and $\tilde{a}_1$, refer to the foregoing descriptions of Table 6 or Table 7. Details are not described herein again.

TABLE 14

| Value range of $\tilde{a}_0$ | Value of $b_0$ | Value of $b_2$ |
| --- | --- | --- |
| $\left[-1, -\frac{2}{3}\right)$ | $1$ | $1$ |
| $\left[-\frac{2}{3}, 0\right)$ | $1$ | $0$ |
| $\left[0, \frac{2}{3}\right)$ | $0$ | $0$ |
| $\left[\frac{2}{3}, 1\right]$ | $0$ | $1$ |

TABLE 15

| Value range of $\tilde{a}_1$ | Value of $b_1$ | Value of $b_3$ |
| --- | --- | --- |
| $\left[-1, -\frac{2}{3}\right)$ | $1$ | $1$ |
| $\left[-\frac{2}{3}, 0\right)$ | $1$ | $0$ |

TABLE 15-continued

| Value range of $\tilde{a}_1$ | Value of $b_1$ | Value of $b_3$ |
|---|---|---|
| $\left[0, \frac{2}{3}\right)$ | 0 | 0 |
| $\left[\frac{2}{3}, 1\right]$ | 0 | 1 |

The foregoing part 1500 may be alternatively replaced by the following part 1500-2:

Part 1500-2: A node obtains fourth data based on third data. The third data includes a plurality of third real numbers. A value range of the third real number is from negative infinity to positive infinity. The fourth data includes a plurality of fourth real numbers. The fourth real number is equal to −1 or equal to 1.

In a possible implementation of the foregoing part 1500-2 and part 1510, the third data (which may also be understood as the soft information) includes two third real numbers $\tilde{L}_0$ and $\tilde{L}_1$, and the fourth data includes four fourth real numbers $a_0$, $a_1$, $a_2$, and $a_3$. Through soft information mapping schematically shown in FIG. 16, $a_0$ and $a_2$ are obtained based on $\tilde{L}_0$, $a_1$ and $a_3$ are obtained based on $\tilde{L}_1$, and 16QAM (that is, the second modulation scheme) modulation is performed on $a_0$, $a_1$, $a_2$, and $a_3$ to obtain the second modulation symbol Q, that is, $Q=1/\sqrt{10}\times\{(2a_0-a_0a_2)+j(2a_1-a_1a_3)\}$ is met.

Table 16 and Table 17 are used as examples. Table 16 shows an example of a possible mapping relationship (which may also be referred to as a correspondence) between $\tilde{L}_0$, and $a_0$ and $a_2$. Table 17 shows an example of a possible mapping relationship between $\tilde{L}_1$, and $a_1$ and $a_3$. A represents a positive real number, +Lim represents positive infinity, and −Lim represents negative infinity. For descriptions of obtaining, by the node, values of $a_0$, $a_1$, $a_2$, and $a_3$ based on value ranges of $\tilde{L}_0$ and $\tilde{L}_1$, refer to the foregoing descriptions of Table 6 or Table 7. Details are not described herein again.

TABLE 16

| Value range of $\tilde{L}_0$ | Value of $a_0$ | Value of $a_2$ |
|---|---|---|
| [+Lim, A) | −1 | −1 |
| [A, 0) | −1 | 1 |
| [0, −A) | 1 | 1 |
| [−A, −Lim] | 1 | −1 |

TABLE 17

| Value range of $\tilde{L}_1$ | Value of $a_1$ | Value of $a_3$ |
|---|---|---|
| [+Lim, A) | −1 | −1 |
| [A, 0) | −1 | 1 |
| [0, −A) | 1 | 1 |
| [−A, −Lim] | 1 | −1 |

It may be understood that the values of the fourth data and the value ranges of the second data that are shown in Table 16 to Table 17 are merely used as examples. The embodiments of this application are not limited to division into the foregoing value ranges, and another correspondence between a value range of the second data and a value of the fourth data is not limited, either.

In addition, it may be understood that the foregoing part 1500 and part 1510 may be alternatively replaced by the following part 1500-3 and part 1510-2:

Part 1500-3: A node obtains fourth data and/or fifth data based on one or more of first data, second data, or third data. The first data includes one or more first real numbers. The first real number is greater than or equal to 0 and less than or equal to 1. The second data includes one or more second real numbers. The second real number is greater than or equal to −1 and less than or equal to 1. The third data includes one or more third real numbers. A value range of the third real number is from negative infinity to positive infinity. The fourth data includes a plurality of fourth real numbers. The fourth real number is equal to −1 or equal to 1. The fifth data includes a plurality of fifth real numbers. The fifth real number is equal to 0 or equal to 1.

Part 1510-2: The node generates, based on the fourth data and/or the fifth data, a second modulation symbol corresponding to a second modulation scheme.

The correspondences shown in the foregoing tables may be configured. The values in the tables are merely examples, and other values may be configured. This is not limited in this application. During configuration of the correspondences between the parameters in the tables, it is not necessarily required that all the correspondences shown in the tables be configured. For example, in the foregoing tables, correspondences shown in some rows may not be configured. For another example, proper variation and adjustment such as splitting, merging, or cropping may be performed based on the foregoing tables. Parameter names shown in heads of the foregoing tables may be alternatively replaced by other names that can be understood by the communications device, and the values or denotation manners of the parameters may be alternatively replaced by other values or denotation manners that can be understood by the communications device. During implementation of the foregoing tables, other data structures may be alternatively used. For example, an array, a queue, a container, a stack, a linear table, a pointer, a linked list, a tree, a graph, a structure, a class, a heap, or a hash table may be used.

"Default" in this application may be understood as default or preset. A default value in this application is a predefined value, a default value, or a preset value. A non-default value in this application is a value other than the foregoing default value. It may be understood that a specific value of the foregoing default value is not limited in this application.

"Predefined" in this application may be understood as defined, predefined, stored, prestored, pre-negotiated, pre-configured, solidified, or pre-fired.

It may be understood that the method implemented by the communications device in the foregoing method embodiments may be alternatively implemented by a component (for example, an integrated circuit or a chip) that can be used for the communications device.

Corresponding to the wireless communication method provided in the foregoing method embodiments, an embodiment of this application further provides a corresponding communications apparatus (which may also be referred to as a communications device). The communications apparatus includes a corresponding module configured to perform each part in the foregoing embodiments. The module may be software, may be hardware, or may be a combination of software and hardware.

Figure 17:
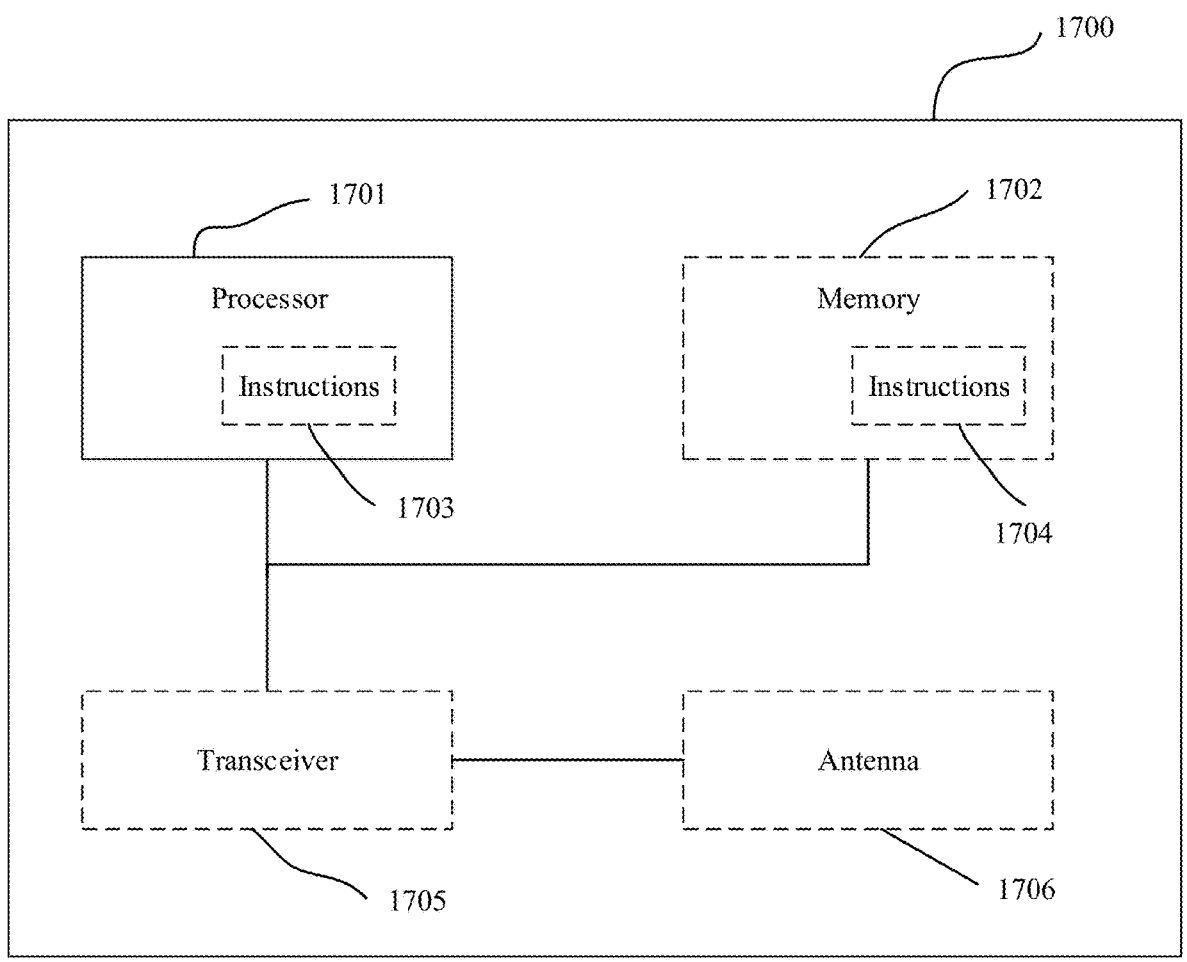
FIG. 17 is a schematic structural diagram of a communications apparatus according to an embodiment of this application.

FIG. 17 is a schematic structural diagram of a communications apparatus. The communications apparatus 1700 may be the network device 10 or 20 in FIG. 1, or may be the terminal 11, 12, 21, or 22 in FIG. 1. It may be understood that the network device and the terminal that are schematically shown in FIG. 1 may also be referred to as nodes. The communications apparatus may be configured to implement the method that corresponds to the communications device (which may also be referred to as the node) and that is described in the foregoing method embodiments. For details, refer to descriptions in the foregoing method embodiments.

The communications apparatus 1700 may include one or more processors 1701. The processor 1701 may also be referred to as a processing unit, and can implement a specific control function. The processor 1701 may be a general purpose processor, a dedicated processor, or the like. For example, the processor may be a baseband processor or a central processing unit. The baseband processor may be configured to process a communications protocol and communication data. The central processing unit may be configured to control the communications apparatus (for example, a base station, a baseband chip, a distributed unit (distributed unit, DU), or a centralized unit (centralized unit, CU)), execute a software program, and process data of the software program.

In some embodiments, the processor 1701 may also store instructions and/or data 1703. The instructions and/or data 1703 may be run by the processor, so that the communications apparatus 1700 performs the method that corresponds to the communications device and that is described in the foregoing method embodiments.

In some embodiments, the processor 1701 may include a transceiver unit configured to implement receiving and sending functions. For example, the transceiver unit may be a transceiver circuit or an interface. Circuits or interfaces configured to implement receiving and sending functions may be separated from each other, or may be integrated with each other.

In some embodiments, the communications apparatus 1700 may include a circuit. The circuit may implement a sending, receiving, or communication function in the foregoing method embodiments.

In some embodiments, the communications apparatus 1700 may include one or more memories 1702, and the memory 1702 may store instructions 1704. The instructions may be run on the processor, so that the communications apparatus 1700 performs the method described in the foregoing method embodiments. In some embodiments, the memory may further store data. In some embodiments, the processor may also store instructions and/or data. The processor and the memory may be separately disposed, or may be integrated with each other. For example, various correspondences described in the foregoing method embodiments may be stored in the memory or stored in the processor.

In some embodiments, the communications apparatus 1700 may further include a transceiver 1705 and/or an antenna 1706. The processor 1701 may be referred to as a processing unit, and controls the communications apparatus (a terminal or a network device). The transceiver 1705 may be referred to as a transceiver unit, a transceiver, a transceiver circuit, a transceiver, or the like, and is configured to implement a transceiver function of the communications apparatus.

In some embodiments, the communications apparatus 1700 (for example, an integrated circuit, a wireless device, a circuit module, a network device, or a terminal) may include a processor 1701 and a transceiver 1705. The processor 1701 generates a first modulation symbol corresponding to a first modulation scheme, and quantizes the first modulation symbol to obtain a target symbol. The target symbol corresponds to one of a plurality of constellation points of a second modulation scheme. The processor 1701 preprocesses the target symbol to obtain to-be-sent data, where the preprocessing includes one or more of layer mapping, antenna port mapping, precoding, or transform precoding. The processor 1701 maps the to-be-sent data to a physical resource, and the transceiver 1705 sends the to-be-sent data by using the physical resource.

The processor and transceiver described in this application may be implemented in an integrated circuit (integrated circuit, IC), an analog IC, a radio frequency integrated circuit RFIC, a mixed-signal IC, an application-specific integrated circuit (application specific integrated circuit, ASIC), a printed circuit board (printed circuit board, PCB), an electronic device, or the like. The processor and transceiver may be made by using various IC process technologies, such as a complementary metal-oxide-semiconductor (complementary metal oxide semiconductor, CMOS), an N-channel metal oxide semiconductor (nMetal-oxide-semiconductor, NMOS), a p-channel metal oxide semiconductor (positive channel metal oxide semiconductor, PMOS), a bipolar junction transistor (Bipolar Junction Transistor, BJT), a bipolar CMOS (BiCMOS), silicon germanium (SiGe), gallium arsenide (GaAs), and the like.

In some embodiments, the communications apparatus is described by using the network device or the terminal as an example. However, a scope of the communications apparatus described in this application is not limited thereto, and a structure of the communications apparatus may not be limited by FIG. 17. The communications apparatus may be an independent device, or may be a part of a larger device. For example, the device may be:

(1) an independent integrated circuit IC, or a chip, or a chip system or subsystem;

(2) a set including one or more ICs, the IC set may also include a storage component configured to store data and/or an instruction;

(3) an ASIC, for example, a modem (MSM);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; or (6) other types of devices or components.

Figure 18:
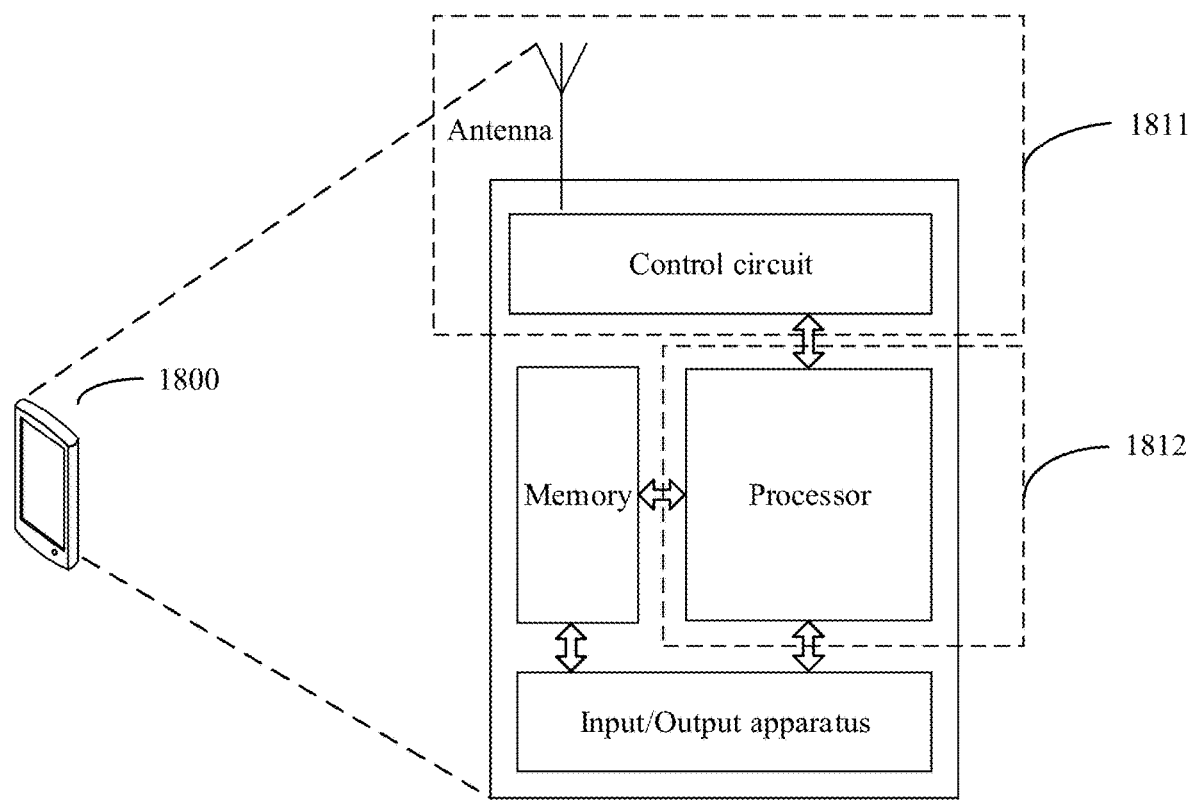
FIG. 18 is a schematic structural diagram of a terminal according to an embodiment of this application.

FIG. 18 is a schematic structural diagram of a terminal. The terminal is applicable to the system shown in FIG. 1. For ease of description, FIG. 18 shows only main components of the terminal. As shown in FIG. 18, the terminal 1800 includes a processor, a memory, a control circuit, an antenna, and an input/output apparatus. The processor is mainly configured to: process a communications protocol and communication data, control the entire terminal, execute a software program, and process data of the software program. The memory is mainly configured to store a software program and data. A radio frequency circuit is mainly configured to perform conversion between a baseband signal and a radio frequency signal, and process the radio frequency signal. The antenna is mainly configured to receive and send radio frequency signals in an electromagnetic wave form. The input/output apparatus, for example, a touchscreen, a display screen, or a keyboard, is mainly configured to receive data entered by a user, and output data to the user.

After the user equipment is powered on, the processor may read a software program in a storage unit, parse and execute instructions of the software program, and process data of the software program. When data needs to be sent wirelessly, the processor outputs a baseband signal to the radio frequency circuit after performing baseband processing on the to-be-sent data. The radio frequency circuit processes the baseband signal to obtain a radio frequency signal, and sends the radio frequency signal to the outside in an electromagnetic wave form by using the antenna. When data is sent to the user equipment, the radio frequency circuit receives a radio frequency signal by using the antenna, and the radio frequency signal is further converted into a baseband signal. The baseband signal is output to the processor. The processor converts the baseband signal into data, and processes the data.

A person skilled in the art may understand that, for ease of description, FIG. 18 shows only one memory and one processor. In an actual terminal, there may be a plurality of processors and memories. The memory may be referred to as a storage medium, a storage device, or the like. This is not limited in this embodiment of the present application.

In an optional implementation, the processor may include a baseband processor and a central processing unit. The baseband processor is mainly configured to process the communications protocol and communication data. The central processing unit is mainly configured to control the entire terminal, execute the software program, and process the data of the software program. The processor in FIG. 18 integrates functions of the baseband processor and the central processing unit. A person skilled in the art may understand that, alternatively, the baseband processor and the central processing unit may be independent processors interconnected by using a technology such as a bus. A person skilled in the art may understand that the terminal may include a plurality of baseband processors to adapt to different network standards, the terminal may include a plurality of central processing units to enhance a processing capability of the terminal, and components of the terminal may be connected by using various buses. The baseband processor may be expressed as a baseband processing circuit or a baseband processing chip. The central processing unit may be expressed as a central processing circuit or a central processing chip. A function of processing the communications protocol and communication data may be built into the processor, or may be stored in the storage unit in a form of a software program. The processor executes the software program to implement the baseband processing function.

In an example, the antenna and the control circuit that have a transceiver function may be considered as a transceiver unit 1811 of the terminal 1800, and the processor that has a processing function may be considered as a processing unit 1812 of the terminal 1800. As shown in FIG. 18, the terminal 1800 includes the transceiver unit 1811 and the processing unit 1812. The transceiver unit may be referred to as a transceiver, a transceiver apparatus, or the like. In some embodiments, a component that is in the transceiver unit 1811 and that is configured to implement a receiving function may be considered as a receiving unit, and a component that is in the transceiver unit 1811 and that is configured to implement a sending function may be considered as a sending unit. In other words, the transceiver unit 1811 includes the receiving unit and the sending unit. For example, the receiving unit may be referred to as a receiver, a receiver circuit, or the like, and the sending unit may be referred to as a transmitter, a transmitter circuit, or the like. In some embodiments, the receiving unit and the sending unit may be one integrated unit, or may be a plurality of independent units. The receiving unit and the sending unit may be at one geographical location, or may be dispersed at a plurality of geographical locations.

Figure 19:
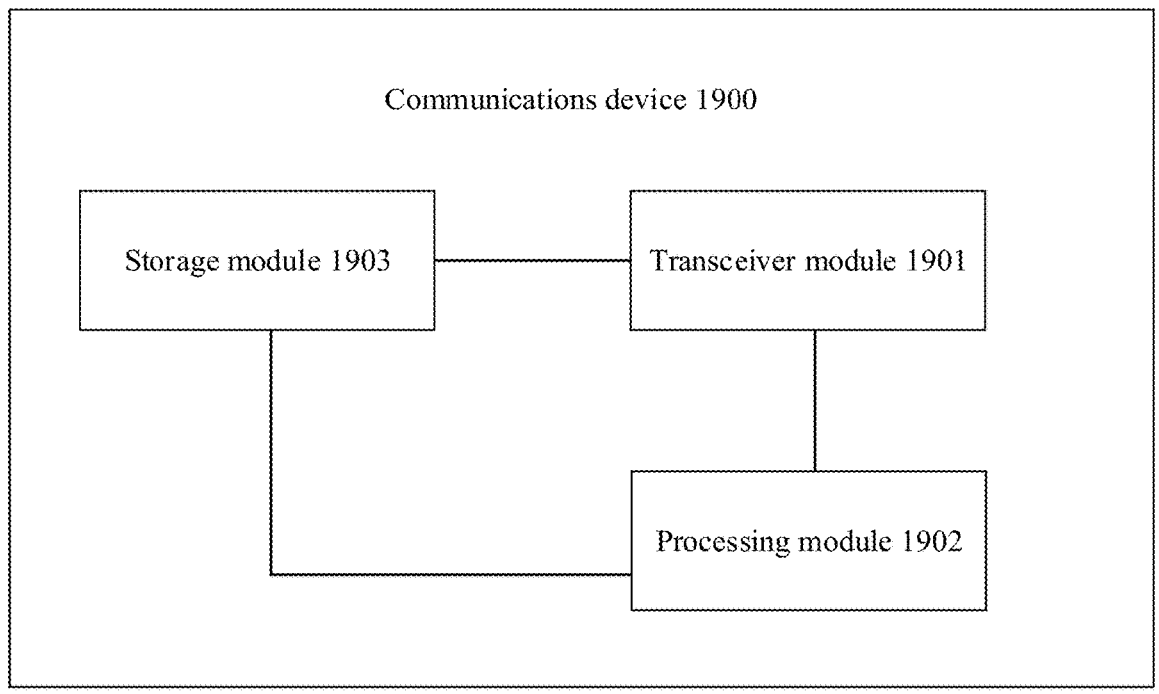
FIG. 19 is a schematic diagram of a communications device according to an embodiment of this application.

As shown in FIG. 19, an embodiment of this application provides a communications device (which may also be referred to as a communications apparatus or a node) 1900. The communications apparatus may be a terminal (for example, the terminal in the system shown in FIG. 1), or may be a component (for example, an integrated circuit or a chip) of a terminal. Alternatively, the communications apparatus may be a network device (for example, the communications apparatus is a base station device that can be applied to the system in FIG. 1), or may be a component (for example, an integrated circuit or a chip) of a network device. The communications apparatus may alternatively be another communications module, configured to implement an operation that corresponds to the communications device and that is in the method embodiments of this application. The communications device 1900 may include a processing module 1902 (a processing unit). In some embodiments, the communications device 1900 may further include a transceiver module 1901 (a transceiver unit) and a storage module 1903 (a storage unit).

In a possible design, one or more modules in FIG. 19 may be implemented by one or more processors, or implemented by one or more processors and memories, or implemented by one or more processors and transceivers, or implemented by one or more processors, memories, and transceivers. This is not limited in this embodiment of this application. The processor, the memory, and the transceiver may be separately disposed, or may be integrated.

The communications apparatus has a function of implementing the terminal described in the embodiments of this application. For example, the communications apparatus includes a module or unit or means (means) corresponding to terminal-related operations that are performed by the terminal and that are described in the embodiments of this application. The function or unit or means (means) may be implemented by software or hardware, or may be implemented by executing corresponding software by hardware. For details, refer to corresponding descriptions in the foregoing corresponding method embodiments.

Alternatively, the communications apparatus has a function of implementing the network device described in the embodiments of this application. For example, the communications apparatus includes a module or unit or means (means) corresponding to network-device-related operations that are performed by the network device and that are described in the embodiments of this application. The function or unit or means (means) may be implemented by software or hardware, or may be implemented by executing corresponding software by hardware. For details, refer to corresponding descriptions in the foregoing corresponding method embodiments.

In some embodiments, the modules in the communications device 1900 in this embodiment of this application may be configured to perform the method described in FIG. 4 in the embodiments of this application.

In a possible implementation, the processing module 1902 generates a first modulation symbol corresponding to a first modulation scheme. The processing module 1902 quantizes the first modulation symbol to obtain a target symbol. The target symbol corresponds to one of a plurality of constellation points of a second modulation scheme. The processing module 1902 preprocesses the target symbol to obtain to-be-sent data. The preprocessing includes one or more of layer mapping, antenna port mapping, precoding, or transform precoding. The processing module 1902 maps the to-be-sent data to a physical resource, and the transceiver module 1901 sends the to-be-sent data by using the physical resource.

According to the data sending apparatus provided in this embodiment of this application, a soft modulation symbol generated through soft modulation is quantized to a limited quantity of constellation points before being sent. This can ensure that a generated signal meets a requirement of an intermediate frequency indicator/a radio frequency indicator.

In some embodiments, the processing module 1902 generates the first modulation symbol based on first data and/or second data. A mapping relationship corresponding to the first modulation scheme is met between the first modulation symbol and the first data and/or the second data. The first data includes one or more first real numbers. The first real number is greater than or equal to 0 and less than or equal to 1. The second data includes one or more second real numbers. The second real number is greater than or equal to −1 and less than or equal to 1.

In some embodiments, the mapping relationship corresponding to the first modulation scheme is one of the following:

$\tilde{Q}=1/\sqrt{2}\times[(1-2\tilde{b}_0)+j(1-2\tilde{b}_0)]$, where $\tilde{b}_0$ is one first real number included in the first data, $\tilde{Q}$ is the first modulation symbol, and j is an imaginary unit;

$\tilde{Q}=1/\sqrt{2}\times[(1-2\tilde{b}_0)+j(1-2\tilde{b}_1)]$, where $\tilde{b}_0$ and $\tilde{b}_1$ are two first real numbers included in the first data, $\tilde{Q}$ is the first modulation symbol, and j is an imaginary unit;

$\tilde{Q}=1/\sqrt{10}\times\{(1-2\tilde{b}_0)[2-(1-2\tilde{b}_2)]+j(1-2\tilde{b}_1)[2-(1-2\tilde{b}_3)]\}$, where $\tilde{b}_0$, $\tilde{b}_1$, $\tilde{b}_2$, and $\tilde{b}_3$ are four first real numbers included in the first data, $\tilde{Q}$ is the first modulation symbol, and j is an imaginary unit;

$\tilde{Q}=1/\sqrt{42}\times\{-2\tilde{b}_0)\ [4-(1-2\tilde{b}_2)[2-(1-2\tilde{b}_4)]]+j(1-2\tilde{b}_1)[4-(1-2\tilde{b}_3)[2-(1-2\tilde{b}_5)]]\}$, where $\tilde{b}_0$, $\tilde{b}_1$, $\tilde{b}_2$, $\tilde{b}_3$, $\tilde{b}_4$, and bs are six first real numbers included in the first data, $\tilde{Q}$ is the first modulation symbol, and j is an imaginary unit;

$\tilde{Q}=1/\sqrt{2}\times[\tilde{a}_0+j\tilde{a}_0]$, where $\tilde{a}_0$ is one second real number included in the second data, $\tilde{Q}$ is the first modulation symbol, and j is an imaginary unit;

$\tilde{Q}=1/\sqrt{2}\times[\tilde{a}_0+j\tilde{a}_1]$, where $\tilde{a}_0$ and $\tilde{a}_1$ are two second real numbers included in the second data, $\tilde{Q}$ is the first modulation symbol, and j is an imaginary unit;

$\tilde{Q}=1/\sqrt{10}\times\{(2\tilde{a}_0-\tilde{a}_0\tilde{a}_2)+j(2\tilde{a}_1-\tilde{a}_1\tilde{a}_3)\}$, where $\tilde{a}_0$, $\tilde{a}_1$, $\tilde{a}_2$, and $\tilde{a}_3$ are four second real numbers included in the second data, $\tilde{Q}$ is the first modulation symbol, and j is an imaginary unit;

$\tilde{Q}=1/\sqrt{42}\times\{(4\tilde{a}_0-2\tilde{a}_0\tilde{a}_2+\tilde{a}_0\tilde{a}_2\tilde{a}_4)+j(4\tilde{a}_1-2\tilde{a}_1\tilde{a}_3+\tilde{a}_1\tilde{a}_3\tilde{a}_5)\}$, where $\tilde{a}_0$, $\tilde{a}_1$, $\tilde{a}_2$, $\tilde{a}_3$, $\tilde{a}_4$, and $\tilde{a}_5$ are six second real numbers included in the second data, $\tilde{Q}$ is the first modulation symbol, and j is an imaginary unit;

$\tilde{Q}=1/\sqrt{2}\times[(1-2\tilde{b}_0)+j\tilde{a}_1]$, where $\tilde{b}_0$ is one first real number included in the first data, $\tilde{a}_1$ is one second real number included in the second data, $\tilde{Q}$ is the first modulation symbol, and j is an imaginary unit; or $\tilde{Q}=1/\sqrt{10}\times\{(1-2\tilde{b}_0)[2-\tilde{a}_2]+j(1-2\tilde{b}_1)[2-\tilde{a}_3]\}$, where $\tilde{b}_0$ and $\tilde{b}_1$ are two first real numbers included in the first data, $\tilde{a}_2$ and $\tilde{a}_3$ are two second real numbers included in the second data, $\tilde{Q}$ is the first modulation symbol, and j is an imaginary unit.

In some embodiments, the processing module 1902 quantizes sixth data to obtain the first data and/or the second data.

In some embodiments, the processing module 1902 obtains the first data and/or the second data based on sixth data. The sixth data and the first data meet $\tilde{b}_i=e^L/(1+e^L)$, where L is the sixth data, and $\tilde{b}_i$ is the first data. The sixth data and the second data meet $\tilde{a}_i=-\tanh(L/2)$, where L is the sixth data, and $\tilde{a}_i$ is the second data.

In some embodiments, the second modulation scheme is binary phase shift keying (BPSK), quadrature phase shift keying (QPSK), 16 quadrature amplitude modulation (16QAM), 64 quadrature amplitude modulation (64QAM), 256 quadrature amplitude modulation (256QAM), 512 quadrature amplitude modulation (512QAM), or 1024 quadrature amplitude modulation (1024QAM).

In some embodiments, the transceiver module 1901 receives first control information, and the processing module 1902 determines, based on the first control information, to quantize the first modulation symbol to obtain the target symbol. The first control information includes first indication information and/or identification information of the communications device 1900. The identification information of the communications device 1900 indicates the communications device 1900. In some embodiments, the first indication information indicates the communications device 1900 or the processing module 1902 to quantize the first modulation symbol to obtain the target symbol; or the first indication information indicates the second modulation scheme; or the first indication information indicates the second modulation scheme, and indicates the communications device 1900 or the processing module 1902 to quantize the first modulation symbol to obtain the target symbol. When the apparatus is used, a soft modulation symbol quantization function may be enabled or disabled based on a data sending requirement, and the communications device can be notified to use a suitable modulation scheme. This improves robustness of data sending.

In some embodiments, the modules in the communications device 1900 in this embodiment of this application may be alternatively configured to perform the method described in FIG. 5, FIG. 10, FIG. 11, FIG. 12, FIG. 13, FIG. 14, FIG. 15, or FIG. 16 in the embodiments of this application. For descriptions of performing, by the modules, the methods corresponding to the other accompanying drawings, refer to descriptions of performing, by the modules, the method corresponding to FIG. 4. Details are not described herein again.

It may be understood that, in some scenarios, some optional features in the embodiments of this application may be independently implemented without relying on another feature, for example, a solution on which the optional features are currently based, to resolve a corresponding technical problem and achieve a corresponding effect; or may be combined with another feature based on a requirement in some scenarios. Correspondingly, the apparatus provided in the embodiments of this application may also correspondingly implement these features or functions. Details are not described herein.

A person skilled in the art may further understand that various illustrative logic blocks (illustrative logic block) and operations that are listed in the embodiments of this application may be implemented by using electronic hardware, computer software, or a combination thereof. Whether the functions are implemented by using hardware or software depends on particular applications and a design requirement of an entire system. A person of ordinary skill in the art may use various methods to implement the described functions for each particular application, but it should not be considered that the implementation goes beyond the scope of the embodiments of this application.

The technologies described in this application may be implemented in various manners. For example, these technologies may be implemented by hardware, software, or a combination of hardware. For implementation by hardware, a processing unit configured to execute these technologies in a communications apparatus (for example, a base station, a terminal, a network entity, or a chip) may be implemented in one or more general purpose processors, a digital signal processor (DSP), a digital signal processing device (DSPD), an application-specific integrated circuit (ASIC), a programmable logic device (PLD), a field programmable gate array (FPGA), another programmable logic apparatus, a discrete gate or transistor logic, a discrete hardware component, or any combination thereof. The general-purpose processor may be a microprocessor. In some embodiments, the general-purpose processor may alternatively be any conventional processor, controller, microcontroller, or state machine. Alternatively, the processor may be implemented by a combination of computing apparatuses, such as a digital signal processor and a microprocessor, a plurality of microprocessors, one or more microprocessors in combination with a digital signal processor core, or any other similar configuration.

A person of ordinary skill in the art may understand that various numbers such as "first" and "second" in this application are merely intended for differentiation for ease of description, but are not intended to limit the scope of the embodiments of this application, and also indicate a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. "At least two" means two or more. "At least one", "any one", or a similar expression thereof means any combination of these items, including a single item (item) or any combination of a plurality of items (items). For example, at least one of a, b, or c may represent: a; b; c; a and b; a and c; b and c; or a, b, and c. Each of a, b, and c may be singular or plural.

In this application, a description that a mapping relationship (which may also be understood as a function relationship) is met between a and b does not mandatorily require that the mapping relationship be precisely met between a and b. For example, if the mapping relationship is precisely met between the value a and a value b', and the value b is obtained by performing an operation such as floating-point removal, rounding, or rounding off on the value b', this may also be understood as that the mapping relationship is met between a and b. It may be understood that "the mapping relationship is met between a and b" may also mean that a mapping relationship obtained through equivalent transformation of the mapping relationship is met between a and b. This is not limited in the embodiments of this application.

Operations of the methods or algorithms described in the embodiments of this application may be directly embedded into hardware, an instruction executed by a processor, or a combination thereof. The memory may be a RAM memory, a flash memory, a ROM memory, an EPROM memory, an EEPROM memory, a register, a hard disk, a removable magnetic disk, a CD-ROM, or a storage medium of any other form in the art. For example, the memory may connect to a processor, so that the processor may read information from the memory and write information to the memory. In some embodiments, the memory may further be integrated into the processor. The processor and the memory may be disposed in an ASIC, and the ASIC may be disposed in a terminal. In some embodiments, the processor and the memory may alternatively be disposed in different components of a terminal.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedure or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data packet storage device, such as a server or a data packet center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like. The foregoing combination shall be included in the protection scope of the computer-readable medium.

For same or similar parts of the embodiments in this specification, reference may be made to each other. The foregoing implementations of this application do not constitute a limitation on the protection scope of this application.

What is claimed is:
1. An apparatus, comprising:
one or more processors;
a non-transitory memory coupled to the one or more processors, wherein the non-transitory memory stores a program to be executed by the one or more processors, the program including instructions for:
generating a first modulation symbol corresponding to a first modulation scheme;
quantizing the first modulation symbol to obtain a target symbol, wherein the target symbol corresponds to one of a plurality of constellation points of a second modulation scheme, and wherein the first modulation scheme is different than the second modulation scheme;
preprocessing the target symbol to obtain to-be-sent data, wherein the preprocessing comprises one or more of layer mapping, antenna port mapping, precoding, or transform precoding, and wherein generating the first modulation symbol corresponding to the first modulation scheme comprises:
generating the first modulation symbol based on at least one of first data or second data, wherein a mapping relationship corresponding to the first modulation scheme is met between the first modulation symbol and at least one of the first data or the second data, wherein
the first data comprises one or more first real numbers, and the first real number is greater than or equal to 0 and less than or equal to 1:
the second data comprises one or more second real numbers, and the second real number is greater than or equal to −1 and less than or equal to 1; and
the mapping relationship corresponding to the first modulation scheme is one of the following:

$\tilde{Q}=1/\sqrt{2}\times[(1-2\tilde{b}_0)+j(1-2\tilde{b}_0)]$, wherein $\tilde{b}_0$ is one first real number comprised in the first data, $\tilde{Q}$ is the first modulation symbol, and j is an imaginary unit;

$\tilde{Q}=1/\sqrt{2}\times[(1-2\tilde{b}_0)+j(1-2\tilde{b}_1)]$, wherein $\tilde{b}_0$ and $\tilde{b}_1$ are two first real numbers comprised in the first data, $\tilde{Q}$ is the first modulation symbol, and j is an imaginary unit;

$\tilde{Q}=1/\sqrt{10}\times\{(1-2\tilde{b}_0)[2-(1-2\tilde{b}_2)]+j(1-2\tilde{b}_1)[2-(1-2\tilde{b}_3)]\}$, wherein $\tilde{b}_0$, $\tilde{b}_1$, $\tilde{b}_2$, and $\tilde{b}_3$ are four first real numbers comprised in the first data, $\tilde{Q}$ is the first modulation symbol, and j is an imaginary unit;

$\tilde{Q}=1/\sqrt{42}\times\{(1-2\tilde{b}_0)[4-(1-2\tilde{b}_2)[2-(1-2\tilde{b}_4)]]+j(1-2\tilde{b}_1)[4-(1-2\tilde{b}_3)[2-(1-2\tilde{b}_5)]]\}$, wherein $\tilde{b}_0$, $\tilde{b}_1$, $\tilde{b}_2$, $\tilde{b}_3$, $\tilde{b}_4$, and $\tilde{b}_5$ are six first real numbers comprised in the first data, $\tilde{Q}$ is the first modulation symbol, and j is an imaginary unit;

$\tilde{Q}=1/\sqrt{2}\times[\tilde{a}_0+j\tilde{a}_0]$, wherein $\tilde{a}_0$ is one second real number comprised in the second data, $\tilde{Q}$ is the first modulation symbol, and j is an imaginary unit;

$\tilde{Q}=1/\sqrt{2}\times[\tilde{a}_0+j\tilde{a}_1]$, wherein $\tilde{a}_0$ and $\tilde{a}_1$ are two second real numbers comprised in the second data, $\tilde{Q}$ is the first modulation symbol, and j is an imaginary unit;

$\tilde{Q}=1/\sqrt{10}\times\{(2\tilde{a}_0-\tilde{a}_0\tilde{a}_2)+j(2\tilde{a}_1-\tilde{a}_1\tilde{a}_2)\}$, wherein $\tilde{a}_0$, $\tilde{a}_1$, $\tilde{a}_2$, and $\tilde{a}_3$ are four second real numbers comprised in the second data, Q is the first modulation symbol, and j is an imaginary unit;

$\tilde{Q}=1/\sqrt{42}\times\{(4\tilde{a}_0-2\tilde{a}_0\ \tilde{a}_2+\tilde{a}_0\tilde{a}_2\tilde{a}_4)+j(4\tilde{a}_1-2\tilde{a}_1\tilde{a}_2+\tilde{a}_1\tilde{a}_3\tilde{a}_5)\}$, wherein $\tilde{a}_0$, $\tilde{a}_1$, $\tilde{a}_2$, $\tilde{a}_3$, $\tilde{a}_4$, and $\tilde{a}_5$ are six second real numbers comprised in the second data, $\tilde{Q}$ is the first modulation symbol, and j is an imaginary unit;

$\tilde{Q}=1/\sqrt{2}\times[(1-2\tilde{b}_0)+j\tilde{a}_1]$, wherein $\tilde{b}_0$ is one first real number comprised in the first data, d is one second real number comprised in the second data, $\tilde{Q}$ is the first modulation symbol, and j is an imaginary unit; or $\tilde{Q}=1/\sqrt{2}\times\{(1-2\tilde{b}_0)[2-\tilde{a}_2]+j(1-2\tilde{b}_1)[2-\tilde{a}_3]\}$, wherein $\tilde{b}_0$ and $\tilde{b}_1$ are two first real numbers comprised in the first data, $\tilde{a}_2$ and $\tilde{a}_3$ are two second real numbers comprised in the second data, $\tilde{Q}$ is the first modulation symbol, and j is an imaginary unit; and mapping the to-be-sent data to a physical resource, and sending the to-be-sent data on the physical resource.

2. The apparatus according to claim 1, wherein the program further includes instructions for:
quantizing sixth data to obtain at least one of the first data or the second data.

3. The apparatus according to claim 1, wherein the program further includes instructions for:
obtaining at least one of the first data or the second data based on sixth data, wherein
the sixth data and the first data meet $$\tilde{b}_i = \frac{e^L}{1+e^L},$$

wherein L is the sixth data, and $b_i$ is the first data; and
the sixth data and the second data meet $$\tilde{a}_i = -\tanh\left(\frac{L}{2}\right),$$

wherein L is the sixth data, and $\tilde{a}_i$ is the second data.

4. The apparatus according to claim 1, wherein the program further includes instructions for:
receiving first control information, and determining, based on the first control information, to quantize the first modulation symbol to obtain the target symbol, wherein
the first control information comprises at least one of first indication information or identification information of a node.

5. The apparatus according to claim 4, wherein the first indication information indicates to quantize the first modulation symbol to obtain the target symbol.

6. The apparatus according to claim 4, wherein the first indication information indicates the second modulation scheme.

7. The apparatus according to claim 4, wherein the first indication information indicates the second modulation scheme, and indicates to quantize the first modulation symbol to obtain the target symbol.

8. A method, comprising:
generating a first modulation symbol corresponding to a first modulation scheme;
quantizing the first modulation symbol to obtain a target symbol, wherein the target symbol corresponds to one of a plurality of constellation points of a second modulation scheme, and wherein the first modulation scheme is different than the second modulation scheme;
preprocessing the target symbol to obtain to-be-sent data, wherein the preprocessing comprises one or more of layer mapping, antenna port mapping, precoding, or transform precoding, and wherein generating the first modulation symbol corresponding to the first modulation scheme comprises:
generating the first modulation symbol based on at least one of first data or second data, wherein a mapping relationship corresponding to the first modulation scheme is met between the first modulation symbol and at least one of the first data or the second data, wherein
the first data comprises one or more first real numbers, and the first real number is greater than or equal to 0 and less than or equal to 1;
the second data comprises one or more second real numbers, and the second real number is greater than or equal to −1 and less than or equal to 1; and
the mapping relationship corresponding to the first modulation scheme is one of the following:

$\tilde{Q}=1/\sqrt{2}\times[(1-2\tilde{b}_0)+j(1-2\tilde{b}_0)]$, wherein $\tilde{b}_0$ is one first real number comprised in the first data, $\tilde{Q}$ is the first modulation symbol, and j is an imaginary unit;

$\tilde{Q}=1/\sqrt{2}\times[(1-2\tilde{b}_0)+j(1-2\tilde{b}_1)]$, wherein $\tilde{b}_0$ and $\tilde{b}_1$ are two first real numbers comprised in the first data, $\tilde{Q}$ is the first modulation symbol, and j is an imaginary unit;

$\tilde{Q}=1/\sqrt{10}\times\{(1-2\tilde{b}_0)[2-(1-2\tilde{b}_2)]+j(1-2\tilde{b}_1)[2-(1-2\tilde{b}_3)]\}$, wherein $\tilde{b}_0$, $\tilde{b}_1$, $\tilde{b}_2$, and $\tilde{b}_3$ are four first real numbers comprised in the first data, $\tilde{Q}$ is the first modulation symbol, and j is an imaginary unit;

$\tilde{Q}=1/\sqrt{42}\times\{(1-2\tilde{b}_0)\ [4-(1-2\tilde{b}_2)[2-(1-2\tilde{b}_4)]]+j(1-2\tilde{b}_1)[4-(1-2\tilde{b}_3)[2-(1-2\tilde{b}_5)]]\}$, wherein $\tilde{b}_0$, $\tilde{b}_1$, $\tilde{b}_2$, $\tilde{b}_3$, $\tilde{b}_4$, and $\tilde{b}_5$ are six first real numbers comprised in the first data, $\tilde{Q}$ is the first modulation symbol, and j is an imaginary unit;

$\tilde{Q}=1/\sqrt{2}\times[\tilde{a}_0+j\tilde{a}_0]$, wherein $\tilde{a}_0$ is one second real number comprised in the second data, $\tilde{Q}$ is the first modulation symbol, and j is an imaginary unit;

$\tilde{Q}=1/\sqrt{2}\times[\tilde{a}_0+j\tilde{a}_1]$, wherein $\tilde{a}_0$ and $\tilde{a}_1$ are two second real numbers comprised in the second data, $\tilde{Q}$ is the first modulation symbol, and j is an imaginary unit;

$\tilde{Q}=1/\sqrt{10}\times\{(2\tilde{a}_0-\tilde{a}_0\tilde{a}_2)+j(2\tilde{a}_1-\tilde{a}_1\tilde{a}_3)\}$, wherein $\tilde{a}_0$, $\tilde{a}_1$, $\tilde{a}_2$, and $\tilde{a}_3$ are four second real numbers comprised in the second data, $\tilde{Q}$ is the first modulation symbol, and j is an imaginary unit;

$\tilde{Q}=1/\sqrt{42}\times\{(4\tilde{a}_0-2\tilde{a}_0\tilde{a}_2+\tilde{a}_0\tilde{a}_2\tilde{a}_4)+j(4\tilde{a}_1-2\tilde{a}_1\tilde{a}_3+\tilde{a}_1\tilde{a}_3\tilde{a}_5)\}$, wherein $\tilde{a}_0$, $\tilde{a}_1$, $\tilde{a}_2$, $\tilde{a}_3$, $\tilde{a}_4$, and $\tilde{a}_5$ are six second real numbers comprised in the second data, $\tilde{Q}$ is the first modulation symbol, and j is an imaginary unit;

$\tilde{Q}=1/\sqrt{2}\times[(1-2\tilde{b}_0)+j\tilde{a}_1]$, wherein $\tilde{b}_0$ is one first real number comprised in the first data, $\tilde{a}_1$ is one second real number comprised in the second data, $\tilde{Q}$ is the first modulation symbol, and j is an imaginary unit; or $\tilde{Q}=1/\sqrt{10}\times\{(1-2\tilde{b}_0)[2-\tilde{a}_2]+j(1-2\tilde{b}_1)[2-\tilde{a}_3]\}$, wherein $\tilde{b}_0$ and $\tilde{b}_1$ are two first real numbers comprised in the first data, $\tilde{a}_2$ and $\tilde{a}_3$ are two second real numbers comprised in the second data, $\tilde{Q}$ is the first modulation symbol, and j is an imaginary unit; and mapping the to-be-sent data to a physical resource, and sending the to-be-sent data on the physical resource.

9. The method according to claim 8, further comprising:
obtaining at least one of the first data or the second data based on sixth data, wherein
the sixth data and the first data meet $$\tilde{b}_i = \frac{e^L}{1+e^L},$$

wherein L is the sixth data, and $\tilde{b}_i$ is the first data; and the sixth data and the second data meet $$\tilde{a}_i = -\tanh\left(\frac{L}{2}\right),$$

wherein L is the sixth data, and $\tilde{a}_i$ is the second data.

10. The method according to claim 8, further comprising:
receiving first control information, and determining, based on the first control information, to quantize the first modulation symbol to obtain the target symbol, wherein
the first control information comprises at least one of first indication information or identification information of a node.

11. A non-transitory computer readable medium, wherein the non-transitory computer readable medium stores instructions that are executable by a computer, and the instructions comprise instructions for:
generating a first modulation symbol corresponding to a first modulation scheme;
quantizing the first modulation symbol to obtain a target symbol, wherein the target symbol corresponds to one of a plurality of constellation points of a second modulation scheme, and wherein the first modulation scheme is different than the second modulation scheme;
preprocessing the target symbol to obtain to-be-sent data, wherein the preprocessing comprises one or more of layer mapping, antenna port mapping, precoding, or transform precoding, and wherein generating the first modulation symbol corresponding to the first modulation scheme comprises:

generating the first modulation symbol based on at least one of first data or second data, wherein a mapping relationship corresponding to the first modulation scheme is met between the first modulation symbol and at least one of the first data or the second data, wherein the first data comprises one or more first real numbers, and the first real number is greater than or equal to 0 and less than or equal to 1;

the second data comprises one or more second real numbers, and the second real number is greater than or equal to −1 and less than or equal to 1; and the mapping relationship corresponding to the first modulation scheme is one of the following:

$\tilde{Q}=1/\sqrt{2}\times[(1-2\tilde{b}_0)+j(1-2\tilde{b}_0)]$, wherein $\tilde{b}_0$ is one first real number comprised in the first data, $\tilde{Q}$ is the first modulation symbol, and j is an imaginary unit;

$\tilde{Q}=1/\sqrt{2}\times[(1-2\tilde{b}_0)+j(1-2\tilde{b}_1)]$, wherein $\tilde{b}_0$ and $\tilde{b}_1$ are two first real numbers comprised in the first data, $\tilde{Q}$ is the first modulation symbol, and j is an imaginary unit;

$\tilde{Q}=1/\sqrt{10}\times\{(1-2\tilde{b}_0)[2-(1-2\tilde{b}_2)]+j(1-2\tilde{b}_1)[2-(1-2\tilde{b}_3)]\}$, wherein $\tilde{b}_0$, $\tilde{b}_1$, $\tilde{b}_2$, and $\tilde{b}_3$ are four first real numbers comprised in the first data, $\tilde{Q}$ is the first modulation symbol, and j is an imaginary unit;

$\tilde{Q}=1/\sqrt{42}\times\{(1-2\tilde{b}_0)[4-(1-2\tilde{b}_2)[2-(1-2\tilde{b}_4)]]+j(1-2\tilde{b}_1)[4-(1-2\tilde{b}_3)[2-(1-2\tilde{b}_5)]]\}$, wherein $\tilde{b}_0$, $\tilde{b}_1$, $\tilde{b}_2$, $\tilde{b}_3$, $\tilde{b}_4$, and $\tilde{b}_5$ are six first real numbers comprised in the first data, $\tilde{Q}$ is the first modulation symbol, and j is an imaginary unit;

$\tilde{Q}=1/\sqrt{2}\times[\tilde{a}_0+j\tilde{a}_0]$, wherein $\tilde{a}_0$ is one second real number comprised in the second data, $\tilde{Q}$ is the first modulation symbol, and j is an imaginary unit;

$\tilde{Q}=1/\sqrt{2}\times[\tilde{a}_0+j\tilde{a}_1]$, wherein $\tilde{a}_0$ and $\tilde{a}_1$ are two second real numbers comprised in the second data, $\tilde{Q}$ is the first modulation symbol, and j is an imaginary unit;

$\tilde{Q}=1/\sqrt{10}\times\{(2\tilde{a}_0-\tilde{a}_0\tilde{a}_2)+j(2\tilde{a}_1-\tilde{a}_1\tilde{a}_2)\}$, wherein $\tilde{a}_0$, $\tilde{a}_1$, $\tilde{a}_2$, and $\tilde{a}_3$ are four second real numbers comprised in the second data, $\tilde{Q}$ is the first modulation symbol, and j is an imaginary unit;

$\tilde{Q}=1/\sqrt{42}\times\{(4\tilde{a}_0-2\tilde{a}_0\tilde{a}_2+\tilde{a}_0\tilde{a}_2\tilde{a}_4)+j(4\tilde{a}_1-2\tilde{a}_1\tilde{a}_2+\tilde{a}_1\tilde{a}_3\tilde{a}_5)\}$ wherein $\tilde{a}_0$, $\tilde{a}_1$, $\tilde{a}_2$, $\tilde{a}_3$, $\tilde{a}_4$, and $\tilde{a}_5$ are six second real numbers comprised in the second data, $\tilde{Q}$ is the first modulation symbol, and j is an imaginary unit;

$\tilde{Q}=1/\sqrt{2}\times[(1-2\tilde{b}_0)+j\tilde{a}_1]$, wherein $\tilde{b}_0$ is one first real number comprised in the first data, $\tilde{a}_1$ is one second real number comprised in the second data, $\tilde{Q}$ is the first modulation symbol, and j is an imaginary unit; or $\tilde{Q}=1/\sqrt{10}\times\{(1-2\tilde{b}_0)[2-\tilde{a}_2]+j(1-2\tilde{b}_1)[2-\tilde{a}_3]\}$, wherein $\tilde{b}_0$ and $\tilde{b}_1$ are two first real numbers comprised in the first data, $\tilde{a}_2$ and $\tilde{a}_3$ are two second real numbers comprised in the second data, $\tilde{Q}$ is the first modulation symbol, and j is an imaginary unit; and mapping the to-be-sent data to a physical resource, and sending the to-be-sent data on the physical resource.

12. The non-transitory computer readable medium according to claim 11, wherein the instructions further comprise instructions for:
quantizing sixth data to obtain at least one of the first data or the second data.

13. The non-transitory computer readable medium according to claim 11, wherein the instructions further comprise instructions for:
- obtaining at least one of the first data or the second data based on sixth data, wherein
- the sixth data and the first data meet $$\tilde{b}_i = \frac{e^L}{1+e^L},$$

wherein L is the sixth data, and $\tilde{b}_i$ is the first data; and
the sixth data and the second data meet $$\tilde{a}_i = -\tanh\left(\frac{L}{2}\right),$$

wherein L is the sixth data, and $\tilde{a}_i$ is the second data.

14. The non-transitory computer readable medium according to claim 11, wherein the instructions further comprise instructions for:
- receiving first control information, and determining, based on the first control information, to quantize the first modulation symbol to obtain the target symbol, wherein
- the first control information comprises at least one of first indication information or identification information of a node.

* * * * *

UNITED STATES PATENT AND TRADEMARK OFFICE
CERTIFICATE OF CORRECTION

PATENT NO. : 12,081,375 B2
APPLICATION NO. : 17/334423
DATED : September 3, 2024
INVENTOR(S) : Pengpeng Dong et al.

It is certified that error appears in the above-identified patent and that said Letters Patent is hereby corrected as shown below:

In the Claims

In Claim 1, Column 42, Line 62, delete "equal to 1:" and insert --equal to 1;--.

In Claim 1, Column 43, Line 4, delete "unit:" and insert --unit;--.

In Claim 1, Column 43, Line 8, delete "unit:" and insert --unit;--.

In Claim 1, Column 43, Line 12, delete "unit:" and insert --unit;--.

In Claim 1, Column 43, Line 18, delete "unit:" and insert --unit;--.

In Claim 1, Column 43, Line 25, delete "unit:" and insert --unit;--.

In Claim 1, Column 43, Line 34, delete "unit:" and insert --unit;--.

In Claim 8, Column 44, Line 43, delete "equal to 1:" and insert --equal to 1;--.

In Claim 8, Column 44, Line 64, delete "unit:" and insert --unit;--.

In Claim 11, Column 46, Line 10, delete "equal to 1:" and insert --equal to 1;--.

In Claim 11, Column 46, Line 28, delete "unit:" and insert --unit;--.

Signed and Sealed this
Third Day of December, 2024

Katherine Kelly Vidal
*Director of the United States Patent and Trademark Office*